(12) United States Patent
Piazza Galarza et al.

(10) Patent No.: US 11,329,585 B2
(45) Date of Patent: May 10, 2022

(54) ELECTRIC MACHINES WITH AIR GAP CONTROL SYSTEMS, AND SYSTEMS AND METHODS OF CONTROLLING AN AIR GAP IN AN ELECTRIC MACHINE

(71) Applicant: General Electric Company, Schenectady, NY (US)

(72) Inventors: Pablo Gabriel Piazza Galarza, Cincinnati, OH (US); Fabian Isaza, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 425 days.

(21) Appl. No.: 16/257,299

(22) Filed: Jan. 25, 2019

(65) Prior Publication Data

US 2020/0244202 A1    Jul. 30, 2020

(51) Int. Cl.
*H02P 23/00* (2016.01)
*H02K 11/25* (2016.01)
(Continued)

(52) U.S. Cl.
CPC .......... *H02P 23/0018* (2013.01); *H02K 1/12* (2013.01); *H02K 1/22* (2013.01); *H02K 9/04* (2013.01);
(Continued)

(58) Field of Classification Search
CPC ...... H02P 23/0018; H02P 31/00; H02P 29/60; H02K 11/25; H02K 11/33; H02K 1/12;
(Continued)

(56) References Cited

U.S. PATENT DOCUMENTS 3,695,944 A   10/1972  Stroble
3,793,092 A    2/1974  Fieldler
(Continued)

FOREIGN PATENT DOCUMENTS

CN   108448959 A   8/2018
JP   2005/318718 A  11/2005

OTHER PUBLICATIONS

Hu et al., The Influence of Air Gap Thickness between the Stator and Rotor on Nuclear Main Pump, Science Direct, The 9th International Conference on Applied Energy—ICAE2017, Energy Procedia 142, Cardiff, UK, Aug. 21-24, 2017, pp. 259-264.
(Continued)

*Primary Examiner* — Muhammad S Islam
*Assistant Examiner* — Devon A Joseph
(74) *Attorney, Agent, or Firm* — Dority & Manning, P.A.

(57) ABSTRACT

Systems and methods of controlling a length of an air gap in an electric machine using an air gap controller may include: determining an air gap length value for an electric machine at least in part using an air gap controller, comparing the determined air gap length value to an air gap target value using the air gap controller, and outputting a control command from the air gap controller to a controllable device associated with an air gap control system when the determined air gap length value differs from the air gap target value by a predefined threshold. A control command may be configured to impart a change to an operating parameter associated with the air gap control system to adjust a length of an air gap between an outer surface of a rotor core and an inner surface of a stator core of the electric machine.

19 Claims, 8 Drawing Sheets

(51) Int. Cl.
*H02K 11/33* (2016.01)
*H02K 1/12* (2006.01)
*H02K 1/22* (2006.01)
*H02K 9/04* (2006.01)
*H02K 9/193* (2006.01)

(52) U.S. Cl.
CPC ............. *H02K 9/193* (2013.01); *H02K 11/25* (2016.01); *H02K 11/33* (2016.01)

(58) Field of Classification Search
CPC ............ H02K 1/22; H02K 9/04; H02K 9/193; H02K 1/04; H02K 2213/09; H02K 2201/03
See application file for complete search history.

(56) References Cited

U.S. PATENT DOCUMENTS

| | | | |
|---|---|---|---|
| 3,892,604 A | 7/1975 | Thornburg et al. | |
| 3,977,919 A | 8/1976 | Foster et al. | |
| 4,144,469 A * | 3/1979 | Miyashita | H02K 21/46 |
| | | | 310/156.28 |
| 4,250,424 A * | 2/1981 | Sento | H02K 21/46 |
| | | | 310/216.004 |
| 4,849,895 A | 7/1989 | Kervistin | |
| 5,126,906 A * | 6/1992 | Ohji | H01F 38/18 |
| | | | 360/281.4 |
| 5,939,809 A * | 8/1999 | Mobius | H02K 1/278 |
| | | | 310/156.28 |
| 7,128,790 B2 | 10/2006 | Waeckerle et al. | |
| 7,656,135 B2 | 2/2010 | Schram et al. | |
| 7,819,990 B2 | 10/2010 | Waeckerle et al. | |
| 9,787,156 B1 * | 10/2017 | Cannon | H02P 25/064 |
| 9,825,502 B2 | 11/2017 | Kamiya | |
| 9,862,059 B2 | 1/2018 | Liebl et al. | |
| 10,794,471 B2 | 10/2020 | Ribbers | |
| 10,826,344 B2 * | 11/2020 | Moore | H02K 1/16 |
| 2003/0011397 A1 | 1/2003 | Briendl et al. | |
| 2009/0212728 A1 | 8/2009 | Yagi et al. | |
| 2010/0019600 A1 * | 1/2010 | Saban | H02K 1/278 |
| | | | 310/156.27 |
| 2010/0100248 A1 | 4/2010 | Minto et al. | |
| 2011/0240204 A1 * | 10/2011 | Clark | C22C 47/20 |
| | | | 156/74 |
| 2012/0146445 A1 | 6/2012 | Tokoi et al. | |
| 2012/0326549 A1 * | 12/2012 | Ha | H02K 1/276 |
| | | | 310/156.21 |
| 2014/0091649 A1 * | 4/2014 | Dragon | H02K 1/2766 |
| | | | 310/51 |
| 2014/0225576 A1 | 8/2014 | Grant et al. | |
| 2014/0265660 A1 * | 9/2014 | Kulkarni | H02K 3/24 |
| | | | 310/54 |
| 2014/0339932 A1 * | 11/2014 | Hossain | H02K 9/19 |
| | | | 310/53 |
| 2015/0288255 A1 * | 10/2015 | Barker | H02K 9/197 |
| | | | 310/43 |
| 2016/0067828 A1 | 3/2016 | Liebl et al. | |
| 2017/0023348 A1 * | 1/2017 | Krummel | G01B 7/14 |
| 2017/0141654 A1 * | 5/2017 | Bodla | H02K 9/20 |
| 2017/0141655 A1 * | 5/2017 | Bodla | H02K 9/22 |
| 2017/0146271 A1 * | 5/2017 | Hasegawa | F04D 29/0566 |
| 2019/0006895 A1 * | 1/2019 | Sim | H02K 5/04 |
| 2020/0028402 A1 * | 1/2020 | Looser | H02K 1/185 |

OTHER PUBLICATIONS

Electrical Machinery Windage Loss Reduction, Xdot Engineering and Analysis, Charlottesville, VA, CAE Associates, Inc., Middlebury, CT, pp. 11.

European Search Report Corresponding to Application No. 20150714 dated May 28, 2020.

\* cited by examiner

ELECTRIC MACHINES WITH AIR GAP CONTROL SYSTEMS, AND SYSTEMS AND METHODS OF CONTROLLING AN AIR GAP IN AN ELECTRIC MACHINE

FIELD

The present disclosure relates to electric machines with air gap control systems, and systems and methods of controlling an air gap in an electric machine.

BACKGROUND

Electric machines are used in a wide variety of settings, including industrial, commercial, and consumer applications. A typical electric machine includes a rotor core assembly and a stator core assembly that circumferentially surrounds the rotor core assembly. The space between the inner surface of the stator core and the outer surface of the rotor core assembly is commonly referred to as an "air gap." An air gap of sufficient length is necessary to allow the rotor core assembly to freely rotate without contacting the stator core. While the length of an air gap in an electric machine may depend on the particular electric machine, typically it is desirable to minimize the length L of the air gap because air has a high magnetic reluctance. Additionally, resistive losses in an electric machine each attributable to eddy currents, windage, and hysteresis typically increase as the length L of the air gap increases.

Electric machines with improved energy efficiency are desired. High performance applications typically call for electric machines with a high-power density, meaning that electric machines with increasingly larger power outputs and yet increasingly smaller machine sizes are desired. The energy efficiency of an electric machine may be described as a ratio of its useful power output to its total power input, typically expressed as a percentage. The difference between the useful power output of an electric machine and its total power output are sometimes referred to as resistive losses. Resistive losses attributable to the air gap in an electric machine are a major contributor to an electric machine's energy efficiency. A smaller air gap length can reduce the magnetizing power requirement of the electric machine and thereby improve its energy efficiency. However, when an air gap becomes too small there is an increased risk of contact between the rotor core and the stator core. Even slight contact between the rotor core and the stator core may cause damage to the electric machine and may also diminish the performance and energy efficiency of an electric machine. More significant contact between the rotor core and the stator core may cause more severe damage to the electric machine including potentially catastrophic failures.

Electric machines with an optimized air gap length are desired, as an optimized air gap length can lead to improved performance and energy efficiency. However, there are numerous operating parameters and/or operating conditions that can affect both the actual length of the air gap as well as the optimum air gap when operating an electric machine under a given set of operating parameters and/or operating conditions. Such operating parameters and/or operating conditions may be complexly interrelated and variable depending on how a particular electric machine is actually or uniquely operated.

Accordingly, there exists a need for electric machines with air gap control systems, and for systems and methods of controlling an air gap in an electric machine.

BRIEF DESCRIPTION

Aspects and advantages will be set forth in part in the following description, or may be obvious from the description, or may be learned through practicing the presently disclosed subject matter.

In one aspect, the present disclosure embraces methods of controlling a length of an air gap in an electric machine using an air gap controller. An exemplary method may include: determining an air gap length value for an electric machine at least in part using an air gap controller, comparing the determined air gap length value to an air gap target value using the air gap controller, and outputting one or more control commands from the air gap controller to one or more controllable devices associated with an air gap control system when the determined air gap length value differs from the air gap target value by a predefined threshold.

The one or more control commands may be configured to impart a change to one or more operating parameters associated with the air gap control system to adjust a length of an air gap between an outer surface of a rotor core and an inner surface of a stator core of the electric machine. The air gap length value may be determined based at least in part on an air gap length model, and the air gap length model may be to utilize one or more model inputs to calculate the air gap length value. The one or more controllable devices and/or the one or more operating parameters may be associated with an electric machine and/or an air gap control system.

In another embodiment, an exemplary method of controlling a length of an air gap in an electric machine using an air gap controller may include: receiving at an air gap controller, one or more model inputs comprising data associated with an air gap control system, determining an adjusted air gap target value for an electric machine at least in part using the air gap controller, comparing an air gap length value for the electric machine to the adjusted air gap target value using the air gap controller, and outputting one or more control commands from the air gap controller to one or more controllable devices associated with the air gap control system when the air gap length value differs from the adjusted air gap target value by a predefined threshold. The one or more control commands may be configured to impart a change to one or more operating parameters associated with the air gap control system to adjust a length of an air gap between an outer surface of a rotor core and an inner surface of a stator core of the electric machine.

In another aspect, the present disclosure embraces air gap control systems. An exemplary air gap control system may include an electric machine, a coolant circulation system, and an air gap controller. An exemplary electric machine may include a rotor core assembly having a rotor core and a rotor shaft operably coupled to the rotor core, and a stator core assembly having a stator core and a stator housing operably coupled to the stator core, with the stator core circumferentially surrounding the rotor core. An exemplary electric machine may further include an air gap having a length, L, with the air gap located between and defined by an inner surface of the stator core and an outer surface of the rotor core. An exemplary coolant circulation system may include a cooling conduit defining a pathway for circulating coolant through the electric machine and/or an air conduit defining a pathway for supplying cooling air to the electric machine.

An exemplary air gap controller may be configured to control the length, L of the air gap at least in part by controlling or more of: a temperature of coolant flowing through the cooling conduit, a flow rate of coolant flowing through the cooling conduit, a temperature of cooling air flowing through the air conduit, a power input to the electric machine, and/or a rotor shaft speed of the electric machine. By way of example, the presently disclosed air gap control systems may be implemented in an aircraft, a marine vessel, or a motor vehicle.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1A:
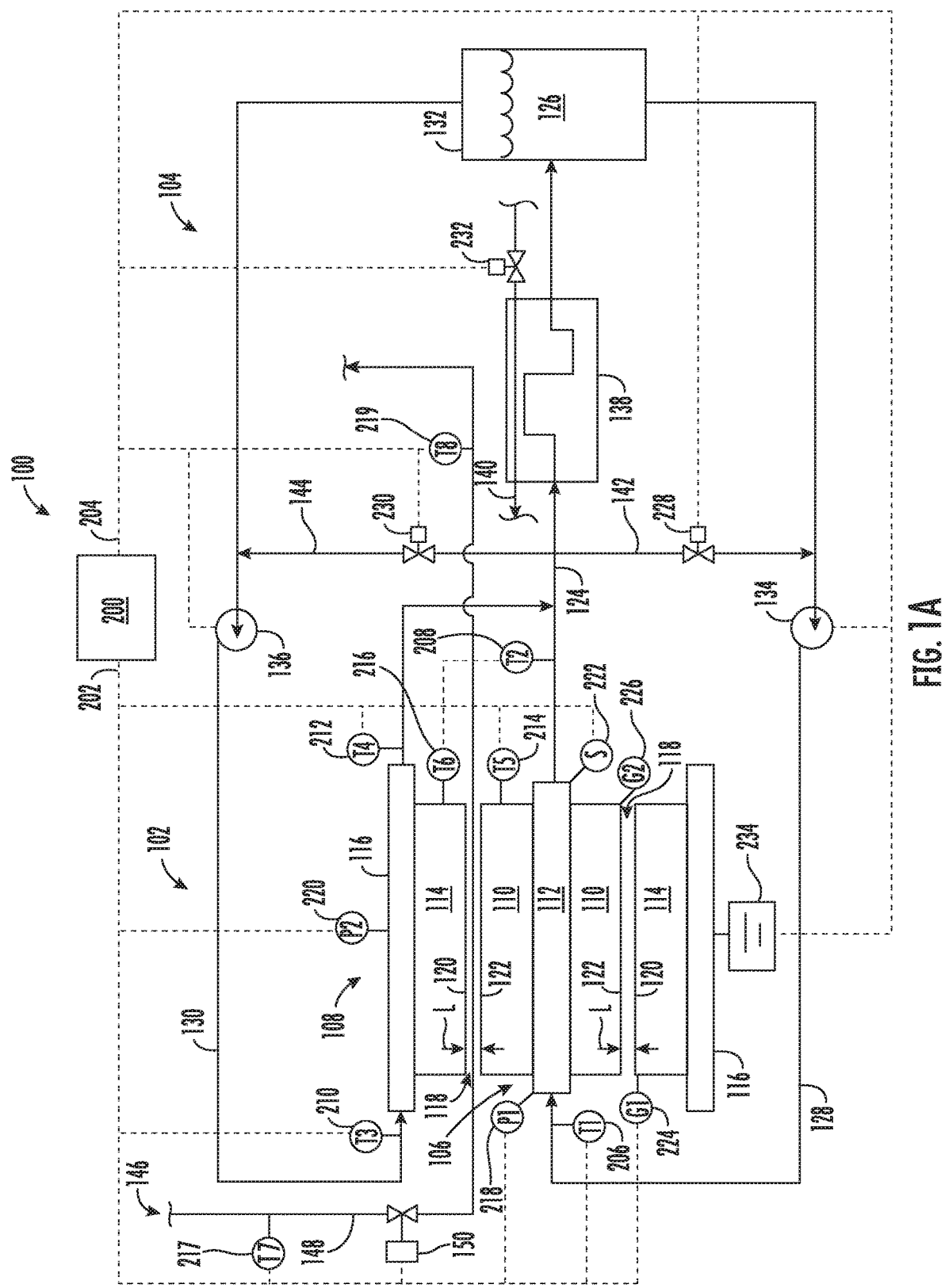
FIGS. 1A-1C schematically depict exemplary air gap control systems.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations may be made in the present disclosure without departing from the scope or spirit of the present disclosure. For instance, features illustrated or described as part of one embodiment may be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

The present disclosure generally provides electric machines with an air gap control system, and systems and methods of controlling an air gap in an electric machine. The length of an air gap may vary because of changing operating parameters and/or operating conditions associated with an electric machine. Additionally, an optimum air gap length may vary depending on the particular operating parameters and/or operating conditions with which an electric machine happens to be operating at any given time. Numerous factors impact both the actual length of the air gap as well as the optimum air gap length. For example, the length of the air gap may vary with centrifugal force of the rotor core assembly, and/or with thermal expansion and contraction of the rotor core assembly, the stator core assembly, and/or various other components of the electric machine. Additionally, the magnetic field in an electric machine may cause the rotor shaft to flex slightly, particularly at regions of the rotor shaft that are furthest from the journals or bearings, etc. that support the rotor shaft. Likewise, these and other factors may affect the optimum air gap length.

Exemplary air gap control systems may improve the performance and energy efficiency of an electric machine. For example, an air gap control system may be configured to control the length of the air gap to optimize for or accommodate different operating parameters and/or operating conditions, or by mitigating or preventing changes to the length of the air gap due to changing operating parameters and/or operating conditions. An air gap control system may be configured to optimize for performance and/or energy efficiency with respect to particular operating parameters and/or operating conditions of the electric machine. For example, an air gap control system may allow an electric machine to operate with a smaller air gap, thereby enhancing the energy efficiency of the electric machine. In some embodiments, an air gap control system may mitigate the risk of the rotor contacting the stator, thereby allowing an electric machine to operate with a smaller air gap that otherwise would not be feasible without such an air gap control system in view of acceptable risk tolerance levels. Exemplary air gap control systems also may reduce resistive losses attributable to eddy currents, windage, and/or hysteresis by controlling the length of the edge gap. Furthermore, in some embodiments an air gap control system may allow an electric machine to operate at higher rotating speeds by opening the air gap to compensate for centrifugal growth.

An electric machine may function as an electric motor and/or an electric generator. An electric motor converts electrical energy into mechanical energy. An electric generator converts mechanical energy into electrical energy. Some examples where an electric machine may be utilized include aircraft, marine vessels, motor vehicles, power generation facilities, manufacturing facilities, industrial machinery, and the like. In the context of an aircraft, an electric machine may be used to supply power to a turbomachine engine, such as a turbofan engine in an aircraft. The power from the electric machine may be used to start the turbomachine engine, or to provide propulsive thrust to the aircraft, including commercial, military, or civilian aircraft, as well as unmanned aircraft such as unmanned aerial vehicles, electric rotorcraft, drones, and the like. In the context of a generator, an electric machine may be used to supply electrical power to auxiliary systems, including auxiliary systems in an aircraft. In some embodiments, and electric machine may function as both an electric motor and as a generator during different operating states. For example, an electric machine may function as an electric motor to start an aircraft engine, and as a generator to supply electric power to systems in the aircraft. It will be appreciated that an electric machine may be used in numerus other settings, and it is intended that the presently disclosed air gap control systems may be implemented in an electric machine in any setting without departing from the scope or spirit of the present disclosure.

Figure 1B:
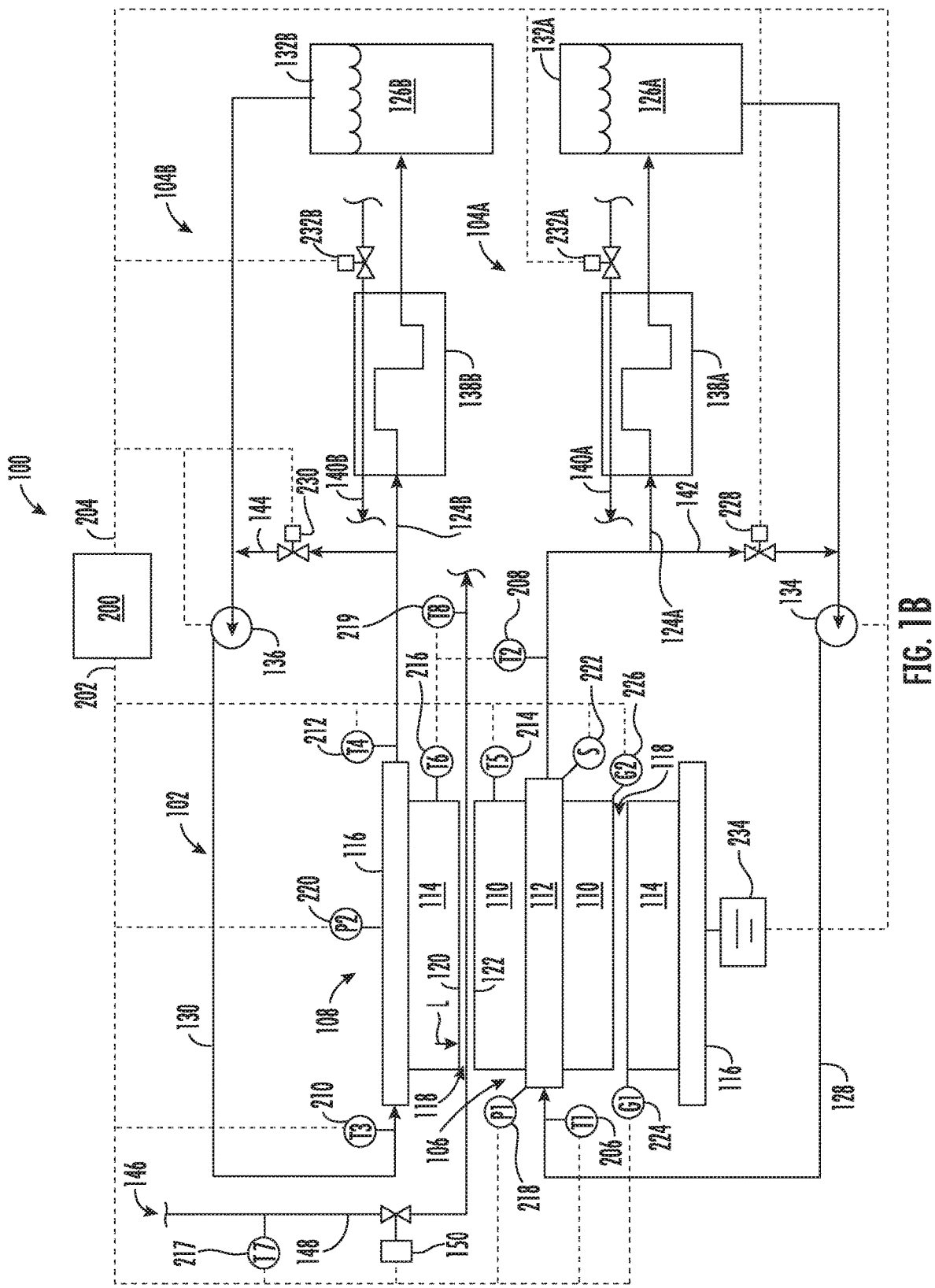
Figure 1C:
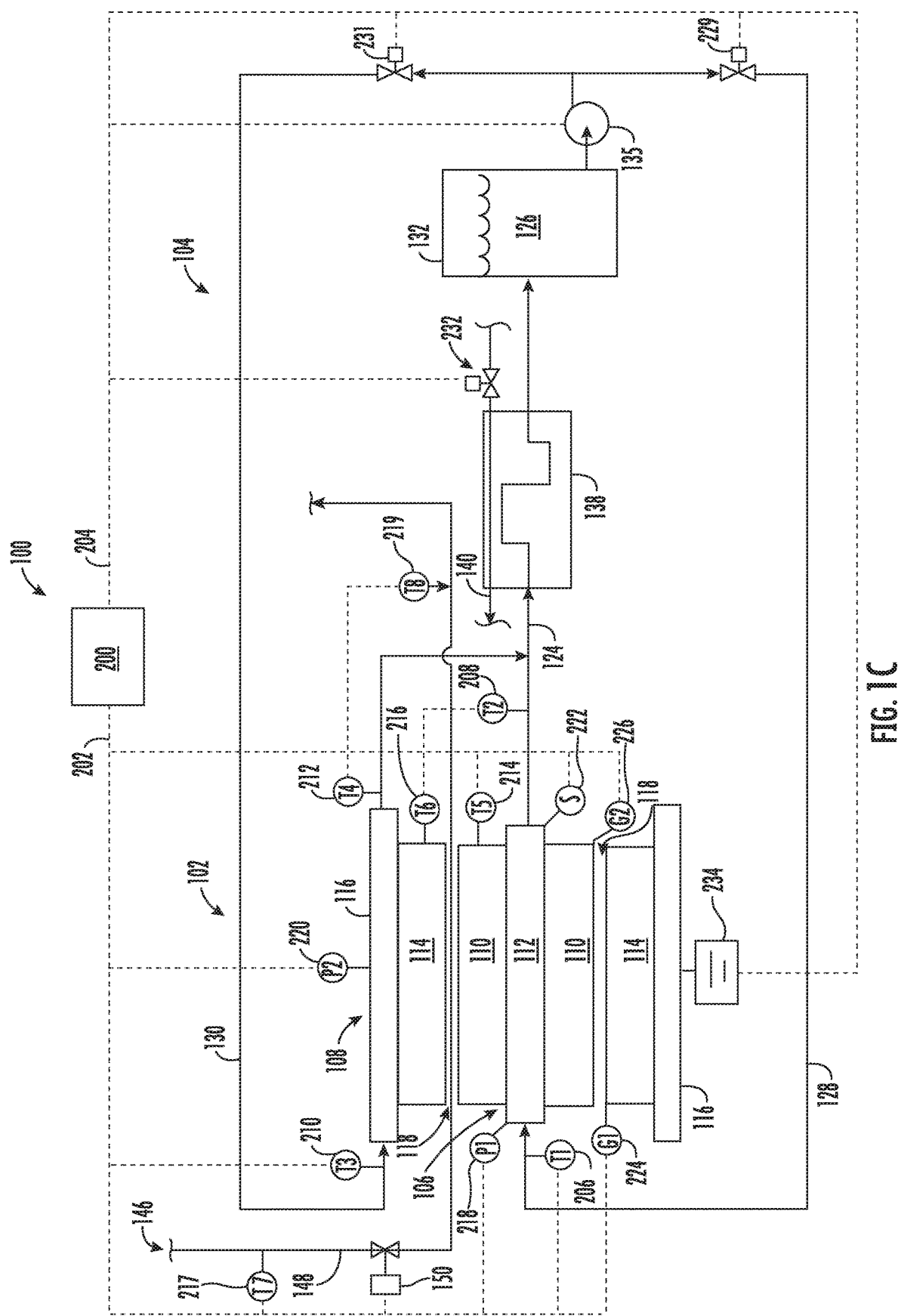

Various embodiments of the present disclosure will now be described in greater detail. Referring to FIGS. 1A-1C, various embodiments of an exemplary air gap control system 100 are shown. An exemplary air gap control system 100 includes an electric machine 102, and a coolant circulation system 104. All or a portion of the coolant circulation system 104 may be formed as an integral part of the electric machine 102 or all or a portion of the coolant circulation system 104 may be separate from but in fluid communication with the electric machine 102. The electric machine 102 includes a rotor core assembly 106 and a stator core assembly 108. The rotor core assembly 106 includes a rotor core 110 and a rotor shaft 112 operably coupled to the rotor core 110. The stator core assembly 108 includes a stator core 114 and a stator housing 116 operably coupled to the stator core 114. The stator core 114 circumferentially surrounds the rotor core 110. The electric machine 102 includes an air gap 118 having a length, L located between and defined by the inner surface 120 of the stator core 114 and the outer surface 122 of the rotor core 110.

The coolant circulation system 104 may include a cooling conduit 124. The cooling conduit 124 defines a pathway for circulating a coolant 126 through the electric machine 102, including the rotor core assembly 106 and/or the stator core assembly 108. At least a portion of the cooling conduit 124 may include structures integrally formed within the electric machine 102. These structures may include one or more of internal or external channels, tubes, pathways, inter-connected or interlaced unit cells, cooling jackets, or the like. The cooling conduit 124 may include a rotor core assembly-cooling conduit 128, which includes structures that define a pathway for circulating coolant 126 through or around at least a portion of the rotor core assembly 106, including at least a portion of the rotor core 110 and/or at least a portion of the rotor shaft 112. Additionally, or in the alternative, the cooling conduit 124 may include a stator core assembly-cooling conduit 130, which includes structures that define a pathway for circulating coolant 126 through or around at least a portion of the stator core assembly 108, including at least a portion of the stator core 114 and/or at least a portion of the stator housing 116. The rotor core assembly-cooling conduit 128 has a thermally conductive relationship with at least a portion of the rotor core assembly 106, including the rotor core 110 and/or the rotor shaft 112. The stator core assembly-cooling conduit 130 has a thermally conductive relationship with at least a portion of the stator core assembly 108, including the stator core 114 and/or the stator housing 116. The coolant circulation system 104 may additionally include one or more coolant reservoirs 132, one or more coolant pumps (e.g., a first coolant pump 134 and/or a second coolant pump 136), and one or more heat exchangers 138.

As shown in FIG. 1A, an air gap control system 100 may include a shared coolant circulation system 104 configured to circulate a shared coolant 126 through a cooling conduit 124 that includes both a rotor core assembly-cooling conduit 128 and a stator core assembly-cooling conduit 130. The coolant circulation system 104 shown in FIG. 1A includes a first coolant pump 134 configured to supply coolant 126 to the rotor core assembly 106 via a rotor core assembly-cooling conduit 128, and a second coolant pump 136 configured to supply coolant 126 to the stator core assembly 108 via a stator core assembly-cooling conduit 130. The coolant circulation system 104 shown in FIG. 1A additionally includes coolant reservoir 132 and a heat exchanger 138 which are shared between the rotor core assembly-cooling conduit 128 and the stator core assembly-cooling conduit 130.

Alternatively, an air gap control system 100 may include separate coolant circulation systems for the rotor core assembly-cooling conduit 128 and the stator core assembly-cooling conduit 130. For example, as shown in FIG. 1B, an air gap control system 100 may include a rotor core coolant circulation system 104A and a stator core coolant circulation system 104B. The rotor core coolant circulation system 104A may include a cooling conduit 124A which supplies rotor core coolant 126A circulating through the rotor core assembly 106 to a rotor core heat exchanger 138A. Rotor core coolant 126A circulating through the rotor core heat exchanger 138A flows to a rotor core coolant reservoir 132A. The first coolant pump 134 supplies rotor core coolant 126A from the rotor core coolant reservoir 132A to the rotor core assembly-cooling conduit 128. Similarly, the stator core coolant circulation system 104B may include a cooling conduit 124B which supplies stator core coolant 126B circulating through the stator core assembly 108 to a stator core heat exchanger 138B. Stator core coolant 126B circulating through the stator core heat exchanger 138B flows to a stator core coolant reservoir 132B. The second coolant pump 136 supplies stator core coolant 126B from the rotor core coolant reservoir 132A to the stator core assembly-cooling conduit 130.

As shown in FIG. 1A, a coolant circulation system 104 may include separate pumps for the rotor core assembly-cooling conduit 128 and the stator core assembly-cooling conduit 130. Alternatively, as shown in FIG. 1C, a coolant circulation system 104 may include a single common coolant pump 135 configured to supply coolant 126 to both the rotor core assembly 106 via the rotor core assembly-cooling conduit 128 and to the stator core assembly 108 via the stator core assembly-cooling conduit 130.

During operation of the electric machine 102, the one or more pumps (e.g., the first coolant pump 134 and/or the second coolant pump 136 and/or the common coolant pump 135) may circulate coolant 126 through the cooling conduit 124. Heat generated by the electric machine 102 transfers to the coolant 126 flowing through the cooling conduit 124 (e.g., to coolant 126 flowing through the rotor core assembly-cooling conduit 128 and/or to coolant 126 flowing through the stator core assembly-cooling conduit 130) at a rate that may depend on the temperature gradient between the coolant 126 and the surface of the cooling conduit 124. The temperature gradient may depend on, among other things, the temperature of the rotor core assembly 106 and/or of the stator core assembly 108, the supply temperature of the coolant 126, and the flow rate of the coolant 126 through the cooling conduit 124. The coolant 126 exits the rotor core assembly-cooling conduit 128 and/or the stator core assembly-cooling conduit 130 having been heated by the thermally conductive relationship therewith.

The laminations and other various components that make up the rotor core assembly 106 and/or the stator core assembly 108 each have a coefficient of thermal expansion (Y), which describes how the size of the component changes with a change in temperature. The coefficient of thermal expansion (Y) may be described with respect to a change in volume, surface area, and/or length with changing temperature. For example, the laminations and other various components that make up a rotor core assembly 106 and/or a stator core assembly 108 each have a coefficient of radial thermal expansion ($Y_r$), which describes how a radial length changes with a change in temperature. Heat transferring to the coolant 126 from the rotor core assembly 106 and/or from the stator core assembly 108 may affect the temperature of such laminations or other various components. Accordingly, the size of the laminations or other various components of the rotor core assembly 106 and/or of the stator core assembly 108 may depend on the temperature and/or the flow rate of the coolant 126 flowing through the cooling conduit 124 (e.g., the rotor core assembly-cooling conduit 128 and/or the stator core assembly-cooling conduit 130), since the temperature and or flow rate affects the heat transfer, temperature, and thermal expansion of such components.

Coolant 126 discharging from the rotor core assembly-cooling conduit 128 and/or the stator core assembly-cooling conduit 130 flows through the cooling conduit 124 to one or more heat exchangers 138, where a heat sink fluid 140 cools the coolant 126. The one or more heat exchangers 138 may have any desired configuration suitable to transfer heat from the coolant 126 to the heat sink fluid 140. Suitable heat exchangers include shell and tube, plate and shell, and plate fin configurations, and the like. The heat exchanger 138 may be an external component or integrally formed within at least a portion of the electric machine 102. The heat sink fluid 140 may be any desired fluid, including a liquid or a gas, or a combination of a liquid and a gas. As shown, coolant 126 passing through the heat exchanger 138 flows to the coolant reservoir 132, however in some embodiments a coolant reservoir 132 need not be provided. For example, the cooling conduit 124 may itself define a coolant reservoir 132. The coolant reservoir 132 may be an integral portion of the electric machine 102, or an external component.

Still referring to FIGS. 1A-1C, a coolant circulation system 104 may additionally or alternatively utilize a stream of cooling air 146 supplied to the electric machine 102, for example, from an air conduit 148. The coolant circulation system 104 may include an air conduit 148 in addition, or as an alternative, to the cooling conduit 124 described herein. The air conduit 148 may define a pathway for supplying cooling air 146 to the electric machine 102, such as to a surface of the rotor core assembly 106 and/or a surface of the stator core assembly 108. For example, the air conduit 148 may supply a stream of cooling air 146 to the air gap 118. During operation, a stream of cooling air 146 from the air conduit 148 may flow across the air gap 118, providing cooling to the rotor core assembly 106 and/or the stator core assembly 108. The cooling air 146 may flow through the air conduit 148 from an upstream pressure having a higher pressure relative to a downstream pressure. For example, the cooling air 146 may include ambient air introduced into the air conduit 148 through an air scoop (not shown) on a nacelle, cowling, housing or the like surrounding the electric motor. At least a portion of the air conduit 148 may include structures integrally formed within the electric machine 102. These structures may include one or more of internal or external channels, tubes, pathways, or the like. A controllable damper 150 may be provided to control the flow rate of the cooling air 146 flowing through the air conduit 148 and across the air gap 118.

During operation of the electric machine 102, the controllable damper 150 may be opened at least a portion so as to circulate cooling air 146 through the air conduit 148. Heat generated by the electric machine 102 transfers to the cooling air 146 flowing from the air conduit 148 and across the air gap 118 (e.g., from the rotor core 110 to the cooling air 146 flowing across the air gap 118 and/or from the stator core 114 to the cooling air 146 flowing across the air gap 118) at a rate that may depend on the temperature gradient between the cooling air 146 and the surface of the rotor core 110 and/or the surface of the stator core 114. The temperature gradient may depend on, among other things, the temperature of the rotor core assembly 106 and/or of the stator core assembly 108, the supply temperature of the cooling air 146, and the flow rate of the cooling air 146 across the air gap 118.

Still referring to FIGS. 1A-1C, an exemplary air gap control system 100 includes one or more air gap controllers 200, one or more sensors configured to provide an input 202 to an air gap controller 200, and one or more controllable devices configured to receive an output 204 that includes a control command from an air gap controller 200. An exemplary air gap controller 200 may include one or more control models or algorithms that utilize one or more inputs 202 from one or more of the sensors to provide one or more outputs 204 that include a control command to one or more of the controllable devices. A single air gap controller 200 may be provided, or a plurality of air gap controllers 200 may be provided. When multiple air gap controllers 200 are provided, each may have responsibility for a different portion of an electric machine 102 and/or for a different purpose of an air gap control system 100.

An air gap controller 200 may be configured to control the length L of the air gap 118 using a temperature and/or a flow rate of coolant 126 flowing through or around the electric machine 102 (e.g., through the rotor core assembly-cooling conduit 128 and/or the stator core assembly-cooling conduit 130). An air gap controller 200 may control the temperature and/or flow rate of the coolant 126, thereby affecting the amount of thermal expansion (Y) in one or more components of the rotor core assembly 106, one or more components of the stator core assembly 108, and/or various other components of the electric machine 102. Additionally, or in the alternative, an air gap controller 200 may be configured to control the length L of the air gap 118 using a temperature and/or a flow rate of cooling air 146 flowing across the air gap 118. An air gap controller 200 may control the temperature and/or flow rate of the cooling air 146, thereby affecting the amount of thermal expansion (Y) in one or more components of the rotor core assembly 106, one or more components of the stator core assembly 108, and/or various other components of the electric machine 102. Further, an air gap controller 200 may be configured, additionally or alternatively, to control the length L of the air gap 118 using a power input and/or rotor shaft speed of the electric machine 102. An air gap controller 200 may control a power input to the electric machine 102, thereby affecting the magnetic flux generated by the electric machine 102, and in turn, the heat transfer, temperature, and thermal expansion of various components of the electric machine 102. An air gap controller 200 may control a rotor shaft speed of the electric machine 102, thereby affecting the centrifugal force acting upon the rotor core assembly 106.

Adjustments and/or controls carried out by an air gap controller 200 may change or control the size of the laminations or other various components of the rotor core assembly 106 and/or of the stator core assembly 108 according to their respective coefficient of thermal expansion (Y), thereby adjusting or controlling the length L of the air gap 118. For example, such adjustments or controls may affect the radial length of the laminations or other various components according to their respective coefficient of radial thermal expansion ($Y_r$). Additionally, or in the alternative, adjustments and/or controls carried out by an air gap controller 200 may control the amount of centrifugal growth and/or flexing of various components of the rotor core assembly 106. An air gap controller 200 may be configured to change the length L of the air gap 118 to optimize for or accommodate different operating parameters and/or operating conditions. For example, an air gap controller 200 may be configured to control the length L of the air gap 118 to an air gap target value, which air gap target value may vary depending on the particular operating parameters and/or operating conditions. Additionally, or in the alternative, an air gap controller 200 may be configured to prevent or mitigate a change in the length L of the air gap 118. For example, such adjustments or controls may prevent or mitigate a change in the size of laminations or other various components of the rotor core assembly 106 and/or of the stator core assembly 108 due to changing operating parameters and/or operating conditions that might otherwise affect the amount of thermal expansion, centrifugal growth, and/or flexing of various components of the electric machine 102.

The one or more sensors in an exemplary air gap control system 100 may include any sensor capable of ascertaining information pertaining to the air gap control system 100 (e.g., information pertaining to the electric machine 102 and/or the coolant system 104) and capable of providing an input 202 to the air gap controller 200. For example, as shown in FIGS. 1A-1C, the one or more sensors may include one or more temperature sensors, 206, 208, 210, 212, 214, 216, 217, 219 one or more power sensors 218, 220, one or more rotor speed sensors 222, and/or one or more air gap sensors 224, 226. The one or more controllable devices in an exemplary air gap control system 100 may include any device capable of receiving an output 204 that includes a control command from the air gap controller 200. For example, as shown in FIG. 1A, the one or more controllable devices may include one or more control valves 228, 230, 232, one or more pumps 134, 136, and/or one or more power control units 234. As shown in FIG. 1B, the one or more controllable devices may include one or more control valves 228, 230, 232A, 232B, one or more pumps 134, 136, and/or one or more power control units 234. As shown in FIG. 1C, the one or more controllable devices may include one or more control valves 229, 231, 232, one or more pumps 135, and/or one or more power control units 234.

In some embodiments, and an air gap controller 200 may determine an air gap length value. The air gap length value may be directly measured, sensed, calculated, ascertained, or otherwise determined. In one embodiment, an air gap controller 200 may determine an air gap length value based at least in part on temperature measurements provided by one or more temperature sensors 206, 208, 210, 212 configured to measure a coolant temperature at one or more locations of the cooling conduit 124 flowing into and out of the rotor core assembly 106 and/or the stator core assembly 108. Such coolant temperatures may be used to determine the temperature of the rotor core assembly 106 or various components thereof and/or to determine the temperature of the stator core assembly 108 or various components thereof. The length L of the air gap 118 may then be determined based at least in part on these determine temperatures of the rotor core assembly 106 and/or stator core assembly 108 and the respective coefficients of thermal expansion (Y) (e.g., the coefficient of radial thermal expansion ($Y_r$)).

As shown in FIGS. 1A-1C, a first temperature sensor $T_1$ 206 may be configured to ascertain a temperature of coolant 126, 126A flowing into the rotor core assembly 106 and a second temperature sensor $T_2$ 208 may be configured to ascertain a temperature of coolant 126, 126A flowing out of the rotor core assembly 106. A rate or quantity of heat transfer from the rotor core assembly 106 to the coolant 126, 126A may be ascertained based at least in part on the difference between the temperature ascertained by the first temperature sensor $T_1$ 206 and the temperature ascertained by the second temperature sensor $T_2$ 208. Additionally, or in the alternative, a temperature of the rotor core assembly 106 (e.g., the rotor core 110 and/or the rotor shaft 112) may be determined based at least in part on a temperature of the coolant 126, 126A, a temperature change in the coolant 126, 126A, and/or rate or quantity of heat transfer to the coolant 126, 126A. A third temperature sensor $T_3$ 210 may be configured to ascertain a temperature of coolant 126, 126B flowing into the stator core assembly 108 and a fourth temperature sensor $T_4$ 212 may be configured to ascertain a temperature of coolant 126, 126B flowing out of the stator core assembly 108. A rate or quantity of heat transfer from the stator core assembly 108 to the coolant 126, 126B may be ascertained based at least in part on the difference between the temperature ascertained by the third temperature sensor $T_3$ 210 and the temperature ascertained by the fourth temperature sensor $T_4$ 212. Additionally, or in the alternative, a temperature of the stator core assembly 108 (e.g., the stator core 114 and/or the stator housing 116) may be determined based at least in part on a temperature of the coolant 126, 126B, a temperature change in the coolant 126, 126B, and/or rate or quantity of heat transfer to the coolant 126, 126B.

Additionally, or in the alternative, an air gap controller 200 may determine an air gap length value based at least in part on temperature measurements provide by one or more temperature sensors 214, 216 configured to measure a rotor core assembly temperature and/or a stator core assembly temperature. As shown in FIGS. 1A-1C, a fifth temperature sensor $T_5$ 214 may be configured to ascertain a temperature of the rotor core assembly 106 and/or a sixth temperature sensor $T_6$ 216 may be configured to ascertain a temperature of the stator core assembly 108. The fifth temperature sensor $T_5$ 214 may ascertain a temperature of the rotor core 110 and/or a temperature of the rotor shaft 112. In some embodiments, multiple temperature sensors may be provided at various locations about the rotor core 110 and/or the rotor shaft 112. The sixth temperature sensor $T_6$ 216 may ascertain a temperature of the stator core 114 and/or a temperature of the stator housing 116. In some embodiments, multiple temperature sensors may be provided at various locations about the stator core 114 and/or the stator housing 116. Any suitable temperature sensors may be used. A gap length value may be determined based at least in part on the temperature of the rotor core assembly 106 and/or the temperature of the stator core assembly 108, and the coefficient of thermal expansion (Y) (e.g., the coefficient of radial thermal expansion ($Y_r$)) for the various components thereof. In some embodiments an air gap controller 200 may additionally or alternatively determine an air gap length value based at least in part on rotor speed measurements provided by one or more rotor speed sensors 222. A rotor core assembly 106 may exhibit centrifugal growth in an amount proportional to the rotational speed of the rotor core assembly 106. Centrifugal force acting upon the rotor core assembly 106 may be ascertained based at least in part on the speed of the rotor core assembly 106. The amount of centrifugal growth exhibited by a rotor core assembly 106 may be determined from such centrifugal force, and an air gap length value may be determined from the amount of centrifugal growth. Accordingly, an air gap controller 200 may be configured to ascertain an air gap length value based at least in part on a correlation between rotor speed and centrifugal growth.

In some embodiments, an air gap controller 200 may additionally or alternatively determine an air gap length value based at least in part on one or more output power measurements provided by one or more power sensors 218, 220. The temperature and/or centrifugal growth of a rotor core assembly 106 and/or the temperature of a stator core assembly 108 may be correlated to output power of the electric machine 102. In the case of an electric machine 102 that operates as an electric motor, the air gap control system 100 may include a first output power sensor 218 configured to measure mechanical output power such as a watt meter, a torque sensor, a speed sensor, or the like. In the case of an electric machine 102 that operates as a generator, the air gap control system 100 may include a second output power sensor 220 configured to measure electrical output power. An output power sensor 218, 220 may take the form of a watt meter, a torque sensor, a speed sensor, or the like.

In some embodiments, an air gap controller 200 may additionally or alternatively determine an air gap length value based at least in part on one or more air gap length measurements provided by one or more air gap length sensors 224, 226. The air gap length sensors may take the form of a capacitive proximity sensor, or any other suitable distance sensor. The air gap length sensors may be non-contact capacitance sensor that generates a signal proportional to an air gap. For example, the air gap length sensor may include a capacitive displacement sensor, such as a capaNCDT 6200 sensor available from Micro-Epsilon of Raleigh, N.C., USA. A plurality of air gap sensors (e.g., a first air gap sensor 224 and a second air gap sensor 226) may be positioned at various locations of an electric machine 102 so as to measure an air gap length at such various locations. For example, air gap sensors 224, 226 may be positioned at intervals across the longitudinal width and/or radial perimeter of the air gap 118. An air gap sensor may be positioned on the stator core assembly 108, as shown with respect to the first air gap sensor 224, and/or on the rotor core assembly 106, as shown with respect to the second air gap sensor 226.

As mentioned, the air gap control system 100 may include one or more controllable devices. In some embodiments, as shown in FIGS. 1A and 1B, an air gap control system 100 may include a rotor core cooling bypass control valve 228 positioned at a rotor core assembly-cooling conduit bypass conduit 142. The rotor core cooling bypass control valve 228 may be configured to allow a volume of coolant 126, 126A flowing through the cooling conduit 124 to bypass the heat exchanger 138, 138A, thereby changing the temperature of the coolant 126, 126A flowing through the rotor core assembly-cooling conduit 128. The rotor core cooling bypass control valve 228 may be modulated, opened, or closed in response to a control command from the air gap controller 200. The rotor core cooling bypass control valve 228 can be opened or modulated in the open-direction to increase the portion of coolant 126, 126A bypassing the heat exchanger 138, thereby changing (e.g., increasing) the temperature of the coolant 126, 126A flowing through the rotor core assembly-cooling conduit 128. The rotor core cooling bypass control valve 228 can be closed or modulated in the closed-direction to decrease the portion of coolant 126, 126A bypassing the heat exchanger 138, 138A, thereby changing (e.g., decreasing) the temperature of the coolant 126, 128A flowing through the rotor core assembly-cooling conduit 128.

In another embodiment, as shown in FIGS. 1A and 1B, an air gap control system 100 may additionally or alternatively include a stator core cooling bypass control valve 230 positioned at a stator core assembly-cooling conduit bypass conduit 144. The stator core cooling bypass control valve 230 may be configured to allow a volume of coolant 126, 126B flowing through the cooling conduit 124 to bypass the heat exchanger 138, 138B, thereby changing the temperature of the coolant 126, 126B flowing through the stator core assembly-cooling conduit 130. The stator core cooling bypass control valve 230 may be modulated, opened, or closed in response to a control command from the air gap controller 200. The stator core cooling bypass control valve 230 may be opened or modulated in the open-direction to increase the portion of coolant 126, 126B bypassing the heat exchanger 138, 138B, thereby increasing the temperature of the coolant 126, 126B flowing through the stator core assembly-cooling conduit 130. The stator core cooling bypass control valve 230 can be closed or modulated in the closed-direction to decrease the portion of coolant 126, 126B bypassing the heat exchanger 138, 138B, thereby decreasing the temperature of the coolant 126, 126B flowing through the stator core assembly-cooling conduit 130.

In still another embodiment, as shown in FIG. 1C, an air gap control system 100 may include a rotor core cooling control valve 229 positioned at a rotor core assembly-cooling conduit 128 and/or a stator core cooling control valve 231 positioned at a stator core assembly-cooling conduit 130. The rotor core cooling control valve 229 may be configured to control the volume of coolant 126 flowing through the rotor core assembly-cooling conduit 128 to the rotor core assembly 106, thereby changing the temperature of the coolant 126 flowing out of the rotor core assembly 106. The rotor core cooling control valve 229 may be modulated, opened, or closed in response to a control command from the air gap controller 200. The stator core cooling control valve 231 may be configured to control the volume of coolant 126 flowing through the stator core assembly-cooling conduit 130 to the stator core assembly 108, thereby changing the temperature of the coolant 126 flowing out of the stator core assembly 108. The stator core cooling control valve 231 may be modulated, opened, or closed in response to a control command from the air gap controller 200.

The rotor core cooling control valve 229 can be opened or modulated in the open-direction to increase the flow rate of coolant 126 flowing to the rotor core assembly 106, thereby changing (e.g., increasing) the amount of heat transfer between the rotor core assembly 106 and the coolant 126 and changing (e.g., decreasing) the temperature of the coolant 126 flowing out of the rotor core assembly 106. The rotor core cooling control valve 229 can be closed or modulated in the closed-direction to decrease the flow rate of coolant 126 flowing to the rotor core assembly 106, thereby changing (e.g., decreasing) the amount of heat transfer between the rotor core assembly 106 and the coolant 126 and changing (e.g., increasing) the temperature of the coolant 126 flowing out of the rotor core assembly 106. Similarly, the stator core cooling control valve 231 can be opened or modulated in the open-direction to increase the flow rate of coolant 126 flowing to the stator core assembly 108, thereby changing (e.g., increasing) the amount of heat transfer between the stator core assembly 108 and the coolant 126 and changing (e.g., decreasing) the temperature of the coolant 126 flowing out of the stator core assembly 108. The stator core cooling control valve 231 can be closed or modulated in the closed-direction to decrease the flow rate of coolant 126 flowing to the stator core assembly 108, thereby changing (e.g., decreasing) the amount of heat transfer between the stator core assembly 108 and the coolant 126 and changing (e.g., increasing) the temperature of the coolant 126 flowing out of the stator core assembly 108.

In another embodiment, as shown in FIGS. 1A and 1B, an air gap control system 100 may additionally or alternatively include a stator core cooling bypass control valve 230 positioned at a stator core assembly-cooling conduit bypass conduit 144. The stator core cooling bypass control valve 230 may be configured to allow a volume of coolant 126, 126B flowing through the cooling conduit 124 to bypass the heat exchanger 138, 138B, thereby changing the temperature of the coolant 126, 126B flowing through the stator core assembly-cooling conduit 130. The stator core cooling bypass control valve 230 may be modulated, opened, or closed in response to a control command from the air gap controller 200. The stator core cooling bypass control valve 230 may be opened or modulated in the open-direction to increase the portion of coolant 126, 126B bypassing the heat exchanger 138, 138B, thereby increasing the temperature of the coolant 126, 126B flowing through the stator core assembly-cooling conduit 130. The stator core cooling bypass control valve 230 can be closed or modulated in the closed-direction to decrease the portion of coolant 126, 126B bypassing the heat exchanger 138, 138B, thereby decreasing the temperature of the coolant 126, 126B flowing through the stator core assembly-cooling conduit 130.

In yet another embodiment, as shown in FIGS. 1A and 1C, an air gap control system 100 may additionally or alternatively include a third control valve 232 configured to start, stop, increase, or decrease a volume of heat sink fluid 140 flowing through or around the heat exchanger 138 in response to a control command from the air gap controller 200, thereby changing the amount of heat transfer with the coolant 126 flowing through the heat exchanger 138, which in turn may change the temperature of the coolant 126 exiting the heat exchanger 138. The third control valve 232 may be opened or modulated in the open-direction to increase the volume of heat sink fluid 140 flowing through or around the heat exchanger 138, thereby decreasing the temperature of the coolant 126 exiting the heat exchanger 138. The third control valve 232 may be closed or modulated in the closed-direction to decrease the volume of heat sink fluid 140 flowing through or around the heat exchanger 138, thereby increasing the temperature of the coolant 126 exiting the heat exchanger 138.

The temperature of the coolant 126 may be controlled using the rotor core cooling bypass control valve 228, the stator core cooling bypass control valve 230, and/or the third control valve 232. In some embodiments, the temperature of the coolant 126 may be increased or decreased to change the rate or quantity of heat transfer from the rotor core assembly 106 to the coolant 126 and/or from the stator core assembly 108 to the coolant 126. With a change in the rate or quantity of heat transfer, the size of one or more laminations or other various components of the rotor core assembly 106 or of the stator core assembly 108 may be changed according to their respective coefficient of thermal expansion (Y), thereby adjusting or controlling the length L of the air gap 118.

Similarly, as shown in FIG. 1B, an air gap control system 100 may additionally or alternatively include a third control valve 232A configured to start, stop, increase, or decrease a first volume of heat sink fluid 140A flowing through or around the rotor core heat exchanger 138A in response to a control command from the air gap controller 200, thereby changing the amount of heat transfer with the rotor core coolant 126A flowing through the rotor core heat exchanger 138A, which in turn may change the temperature of the rotor core coolant 126A exiting the rotor core heat exchanger 138A. The third control valve 232A may be opened or modulated in the open-direction to increase the first volume of heat sink fluid 140A flowing through or around the rotor core heat exchanger 138A, thereby decreasing the temperature of the rotor core coolant 126A exiting the rotor core heat exchanger 138A. The third control valve 232A may be closed or modulated in the closed-direction to decrease the first volume of heat sink fluid 140A flowing through or around the rotor core heat exchanger 138A, thereby increasing the temperature of the rotor core coolant 126A exiting the rotor core heat exchanger 138A.

The temperature of the rotor core coolant 126A may be controlled using the rotor core cooling bypass control valve 228 and/or the third control valve 232A. In some embodiments, the temperature of rotor core coolant 126A may be increased or decreased to change the rate or quantity of heat transfer from the rotor core assembly 106 to the rotor core coolant 126A. With a change in the rate or quantity of heat transfer, the size of one or more laminations or other various components of the rotor core assembly 106 may be changed according to their respective coefficient of thermal expansion (Y), thereby adjusting or controlling the length L of the air gap 118.

As additionally shown in FIG. 1B, an air gap control system 100 may additionally or alternatively include a fourth control valve 232B configured to start, stop, increase, or decrease a second volume of heat sink fluid 140B flowing through or around the stator core heat exchanger 138B in response to a control command from the air gap controller 200, thereby changing the amount of heat transfer with the stator core coolant 126B flowing through the stator core heat exchanger 138B, which in turn may change the temperature of the stator core coolant 126B exiting the heat exchanger 138. The fourth control valve 232B may be opened or modulated in the open-direction to increase the second volume of heat sink fluid 140B flowing through or around the stator core heat exchanger 138B, thereby decreasing the temperature of the stator core coolant 126B exiting the stator core heat exchanger 138B. The fourth control valve 232B may be closed or modulated in the closed-direction to decrease the second volume of heat sink fluid 140B flowing through or around the stator core heat exchanger 138B, thereby increasing the temperature of the stator core coolant 126B exiting the stator core heat exchanger 138B.

The temperature of the stator core coolant 126B may be controlled using the stator core cooling bypass control valve 230 and/or the third control valve 232B. In some embodiments, the temperature of the stator core coolant 126B may be increased or decreased to change the rate or quantity of heat transfer from the stator core assembly 108 to the stator core coolant 126B. With a change in the rate or quantity of heat transfer, the size of one or more laminations or other various components of the stator core assembly 108 may be changed according to their respective coefficient of thermal expansion (Y), thereby adjusting or controlling the length L of the air gap 118.

In even further embodiments, as shown in FIGS. 1A and 1B, an air gap control system 100 may include one or more pumps 134, 136 configured to change the flow rate of coolant 126 (or the flow rate of rotor core coolant 126A and/or stator core coolant 126B) flowing through the cooling conduit 124 in response to a control command from the air gap controller 200. As shown in FIGS. 1A and 1B, a first cooling pump 134 may be configured to supply a flow of coolant 126 (or rotor core coolant 126A) through the rotor core assembly-cooling conduit 128, and a second cooling pump 136 may be configured to supply a flow of coolant 126 (or stator core coolant 126B) through the stator core assembly-cooling conduit 130. A flow rate of coolant 126 (or rotor core coolant 126A) flowing through the rotor core assembly-cooling conduit 128 may be modulated, started, or stopped using the first coolant pump 134. Likewise, a flow rate of coolant 126 (or stator core coolant 126B) flowing through the stator core assembly-cooling conduit 130 may be modulated, started, or stopped using the second coolant pump 136. Additionally, or alternatively, a flow rate of coolant 126 (or rotor core coolant 126A and/or stator core coolant 126B) flowing through the cooling conduit 124 (e.g., rotor core assembly-cooling conduit 128 and/or the stator core assembly-cooling conduit 130) may be modulated, started, or stopped using a control valve 228, 230. The flow rate of coolant 126 (or rotor core coolant 126A and/or stator core coolant 126B) may be increased or decreased to change the rate or quantity of heat transfer from the rotor core assembly 106 to the coolant 126 and/or from the stator core assembly 108 to the coolant 126. With a change in the rate or quantity of heat transfer, the size of one or more laminations or other various components of the rotor core assembly 106 and/or of the stator core assembly 108 may be changed according to their respective coefficient of thermal expansion (Y), thereby adjusting or controlling the length L of the air gap 118.

As shown in FIG. 1C, an air gap control system 100 may include one a common coolant pump 135 configured to change the flow rate of coolant 126 flowing through the cooling conduit 124 in response to a control command from the air gap controller 200. As shown in FIG. 1C, a common coolant pump 135 may be configured to supply a flow of coolant 126 through both the rotor core assembly-cooling conduit 128 and the stator core assembly-cooling conduit 130. The common coolant pump 135 may work in concert with the rotor core cooling control valve 229 229 and the stator core cooling control valve 231. A flow rate of coolant 126 flowing through the rotor core assembly-cooling conduit 128 and/or through the stator core assembly-cooling conduit 130 may be modulated, started, or stopped using the common coolant pump 135. Additionally, or alternatively, the proportion of coolant 126 flowing through the rotor core assembly-cooling conduit 128 and the stator core assembly-cooling conduit 130 may be increased or decreased using the rotor core cooling control valve 229 and/or the stator core cooling control valve 231. The flow rate of coolant 126 may be increased or decreased to change the rate or quantity of heat transfer from the rotor core assembly 106 to the coolant 126 and/or from the stator core assembly 108 to the coolant 126. With a change in the rate or quantity of heat transfer, the size of one or more laminations or other various components of the rotor core assembly 106 and/or of the stator core assembly 108 may be changed according to their respective coefficient of thermal expansion (Y), thereby adjusting or controlling the length L of the air gap 118.

In still further embodiments, as shown in FIGS. 1A-1C, an air gap control system 100 may include one or more power control units 234 configured to change a power input or a power output of the electric machine 102 in response to a control command from the air gap controller 200. For example, the power control unit 234 may increase or decrease the speed of the rotor shaft 112 and/or the magnetic flux generated by the electric machine 102. Additionally, or alternatively, the power control unit 234 may restrict the permissible rate of change (e.g., acceleration) of the rotor shaft 112. An increase or decrease in the power input or power output of the electric machine 102 may change the rate or quantity of heat generation in the rotor core assembly 106 and/or the stator core assembly. Such a change in the rate or quantity of heat generation may change the size of one or more laminations or other various components of the rotor core assembly 106 and/or of the stator core assembly 108 according to their respective coefficient of thermal expansion (Y), thereby adjusting or controlling the length L of the air gap 118. Additionally, an increase or decrease in the speed of the rotor shaft 112 may change the amount of centrifugal growth exhibited by a rotor core assembly 106, thereby adjusting or controlling the length L of the air gap 118.

The air gap control systems 100 shown in FIGS. 1A-1C may be configured to adjust or control the length L of the air gap 118 at least in part by allocating cooling capacity between the rotor core assembly 106 and the stator core assembly 108. The length of the air gap 118 may be widened by decreasing the temperature of the coolant 126 flowing to the rotor core assembly 106 and/or increasing the temperature of the coolant flowing to the stator core assembly 108. Conversely, the length of the air gap 118 may be narrowed by increasing the temperature of the coolant 126 flowing to the rotor core assembly 106 and/or decreasing the temperature of the coolant flowing to the stator core assembly 108. When the temperature of the coolant 126 flowing through the rotor core assembly 106 decreases, thermal contraction of the rotor core assembly 106 widens the length L of the air gap 118. When the temperature of the coolant 126 flowing through the stator core assembly 108 increases, thermal expansion of the stator core assembly 108 also widens the length L of the air gap 118. Conversely, when the temperature of the coolant 126 flowing through the rotor core assembly 106 increases, thermal expansion of the rotor core assembly 106 narrows the length L of the air gap 118; and/or when the temperature of the coolant 126 flowing through the stator core assembly 108 decreases, thermal contraction of the stator core assembly 108 also narrows the length L of the air gap 118.

With the air gap control system 100 shown in FIGS. 1A and 1B, the length of the air gap 118 may be increased using the rotor core cooling bypass control valve 228 and/or the stator core cooling bypass control valve 230. The length L of the air gap 118 may be widened by increasing the proportion of coolant 126 that bypasses the heat exchanger 138 and returns to the stator core assembly 108 via the stator core assembly-cooling conduit 130 and/or increasing the proportion of coolant that flows through the heat exchanger 138 before returning to the rotor core assembly 106. The length L of the air gap 118 may be narrowed by increasing the proportion of coolant 126 that bypasses the heat exchanger 138 and returns to the rotor core assembly 106 via the rotor core assembly-cooling conduit 128 and/or increasing the proportion of coolant that flows through the heat exchanger 138 before returning to the stator core assembly 108. In some embodiments, an air gap control system 100 may include a rotor core cooling bypass control valve 228 but not a stator core cooling bypass control valve 230, or a stator core cooling bypass control valve 230 but not a rotor core cooling bypass control valve 228.

With the air gap control system 100 shown in FIG. 1B, the temperature of the rotor core coolant 126A and the temperature of the stator core coolant 126B can be controlled independently from one another. Additionally, in some embodiments the rotor core coolant 126A and the stator core coolant 126B may include different types of coolant.

With the air gap control system 100 shown in FIG. 1C, the length of the air gap 118 may be increased using the rotor core cooling control valve 229 and/or the stator core cooling control valve 231. The length L of the air gap 118 may be widened by increasing the proportion of coolant 126 that flows to the rotor core assembly 106 via the rotor core assembly-cooling conduit 128 relative to the proportion of coolant 126 that flows to the stator core assembly 108 via the stator core assembly-cooling conduit 130. The length L of the air gap 118 may be narrowed by decreasing the proportion of coolant 126 that flows to the rotor core assembly 106 via the rotor core assembly-cooling conduit 128 relative to the proportion of coolant 126 that flows to the stator core assembly 108 via the stator core assembly-cooling conduit 130. In some embodiments, an air gap control system 100 may include a rotor core cooling control valve 229 but not a stator core cooling control valve 231, or a stator core cooling control valve 231 but not a rotor core cooling control valve 229.

In some embodiments, as shown in FIGS. 1A-1C, an air gap control system 100 may include one or more temperature sensors 217, 218 configured measure a cooling air temperature at one or more locations of the air conduit 148. A seventh temperature sensor $T_7$ 217 may be configured to ascertain a temperature of cooling air 146 flowing through an inlet side of the air conduit 148 and an eighth temperature sensor $T_8$ 219 may be configured to ascertain a temperature of cooling air 146 flowing through an outlet side of the air conduit 148. A rate or quantity of heat transfer from the rotor core assembly 106 and/or from the stator core assembly 108 to the cooling air 146 may be ascertained based at least in part on the difference between the temperature ascertained by the seventh temperature sensor $T_7$ 217 and the temperature ascertained by the eighth temperature sensor $T_8$ 219.

Such cooling air temperature may be utilized to control the flow rate or the cooling air 146. An air gap control system 100 may include a controllable damper 150 that may be modulated, opened, or closed in response to a control command from the air gap controller 200. The controllable damper 150 may be opened or modulated in the open-direction to increase the portion of cooling air 146 flowing across the air gap, thereby changing the rate of heat transfer between the rotor core 110 and the cooling air 146 and/or between the stator core 114 and the cooling air 146.

Now referring to FIG. 2, an exemplary air gap controller 200 will be described in further detail. An air gap controller 200 may include one or more computing devices 250, which may be located on or within an electric machine 102, adjacent to an electric machine 102, or at a remote location relative to the electric machine 102. The one or more computing devices 250 may include one or more processors 252 and one or more memory devices 254. The one or more processors 252 may include any suitable processing device, such as a microprocessor, microcontroller, integrated circuit, logic device, and/or other suitable processing device. The one or more memory devices 254 may include one or more computer-readable media, including but not limited to non-transitory computer-readable media, RAM, ROM, hard drives, flash drives, and/or other memory devices.

The one or more memory device 254 may store information accessible by the one or more processors 252, including computer-readable instructions 256 that can be executed by the one or more processors 252. The instructions 256 may be any set of instructions which when executed by the one or more processors 252 cause the one or more processors 252 to perform operations. In some embodiments, the instructions 256 may be configured to cause the one or more processors 252 to perform operations for which the air gap controller 200 and/or the one or more computing devices 250 are configured. Such operations may include controlling a temperature and/or a flow rate of the coolant 126 flowing through the cooling conduit 124, so as to adjust and/or control the length L of the air gap 118. Such operations may additionally or alternatively include controlling a flow rate of cooling air 146 flowing through the air conduit 148 and across the air gap 118, so as to adjust and/or control the length L of the air gap 118. The length L of the air gap 118 may be adjusted and/or controlled so as to optimize for or accommodate different operating parameters and/or operating conditions, and/or so as to prevent or mitigate a change in the length L of the air gap 118 as operating parameters or operating conditions change. Additionally, such operations may include adjusting air gap target values and/or adjusting air gap control models 274 used for determining air gap length targets. Such operations may be carried out according to control commands provided by an air gap control model 274. The instructions 256 can be software written in any suitable programming language or can be implemented in hardware. Additionally, and/or alternatively, the instructions 256 can be executed in logically and/or virtually separate threads on processors 252.

The memory devices 254 may store data 258 accessible by the one or more processors 252. The data 258 can include current or real-time data, past data, or a combination thereof. The data 258 may be stored in a data library 260. As examples, the data 258 may include data associated with or generated by an air gap control system 100, including data associated with or generated by an electric machine 102, and/or a coolant circulation system 104 for the electric machine 102, including data 258 associated with or generated by an air gap controller 200, a computing device 250, and/or an air gap control model 274. The data 258 may also include other data sets, parameters, outputs, information, etc. shown and/or described herein. The past operating data may include an operating history for various operating intervals such as, for example, Operating Interval A, Operating Interval B, Operating Interval C, and so on up to the Nth Operating Interval. The past operating data associated with each Operating Interval may include past operating parameters, past operating conditions, past mission management system (MMS) data (e.g., flight management system (FMS) data), and/or past Operating Interval profiles indicative of the nature and conditions of the particular Operating Interval.

In one embodiment, such as when the air gap control system 100 is implemented in an aircraft, marine vessel, motor vehicle, or the like, the data 258 may include past mission data (e.g., flight missions, marine missions, land missions) for the electric machine 102 or other similar electric machines stored in a data library 260. The past mission data may include a past mission history for one or more various missions such as, for example, Mission A, Mission B, Mission C, and so on up to the Nth Mission. The past mission data associated with each Mission may include past operating parameters, past operating conditions, past MMS data (e.g., FMS data), and/or past Mission profiles indicative of the nature and conditions of the particular Mission.

In another embodiment, the operating intervals may be maintenance or service intervals for the electric machine 102 or various components thereof. The past operating data may contain a past maintenance or service history for various maintenance or service intervals, such as, for example, Service Interval A, Service Interval B, Service Interval C, and so on up to the Nth Service Interval. The maintenance or service intervals may include intervals between any form of maintenance or service typically performed on electric machines. The past service data associated with each Service Interval may include past operating parameters, past operating conditions, past MMS data (e.g., FMS data), and/or past Service Interval profiles indicative of the nature and conditions of the particular Service Interval.

The one or more computing devices 250 may also include a communication interface 262, which may be used for communications with a communications network 264 wired or wireless communication lines 266. The communication network 264 may include, for example, a local area network (LAN), a wide area network (WAN), SATCOM network, VHF network, a HF network, a Wi-Fi network, a WiMAX network, a gatelink network, and/or any other suitable communications network for transmitting messages to and/or from the air gap controller 200 across the communication lines 266. The communication interface 262 may allow the computing device 250 to communicate with one or more sensors and with one or more controllable devices of an air gap control system 100. The communication interface 262 may additionally allow the computing device 250 to communicate with the other components of the electric machine 102 and/or other components of an aircraft, marine vessel, motor vehicle, or facility where the electric machine 102 has been implemented.

The communication interface 262 may additionally or alternatively allow the computing device 250 to communicate with one or more external resources, such as a server 268 or a data warehouse 270. As an example, at least a portion of the data 258 may be stored in the data warehouse 270, and the server 268 may be configured to transmit data 258 from the data warehouse 270 to the computing device 250, and/or to receive data 268 from the computing device 250 and to store the received data 268 in the data warehouse 270 for further purposes. In some embodiments, the server 268 and/or the data warehouse 270 may be implemented as part of a mission management system (MMS) 272 such as a flight management system (FMS). The communication interface 262 may include any suitable components for interfacing with one or more network(s), including for example, transmitters, receivers, ports, controllers, antennas, and/or other suitable components. The communication lines 266 of communication network 264 may include a data bus or a combination of wired and/or wireless communication links.

Figure 2:
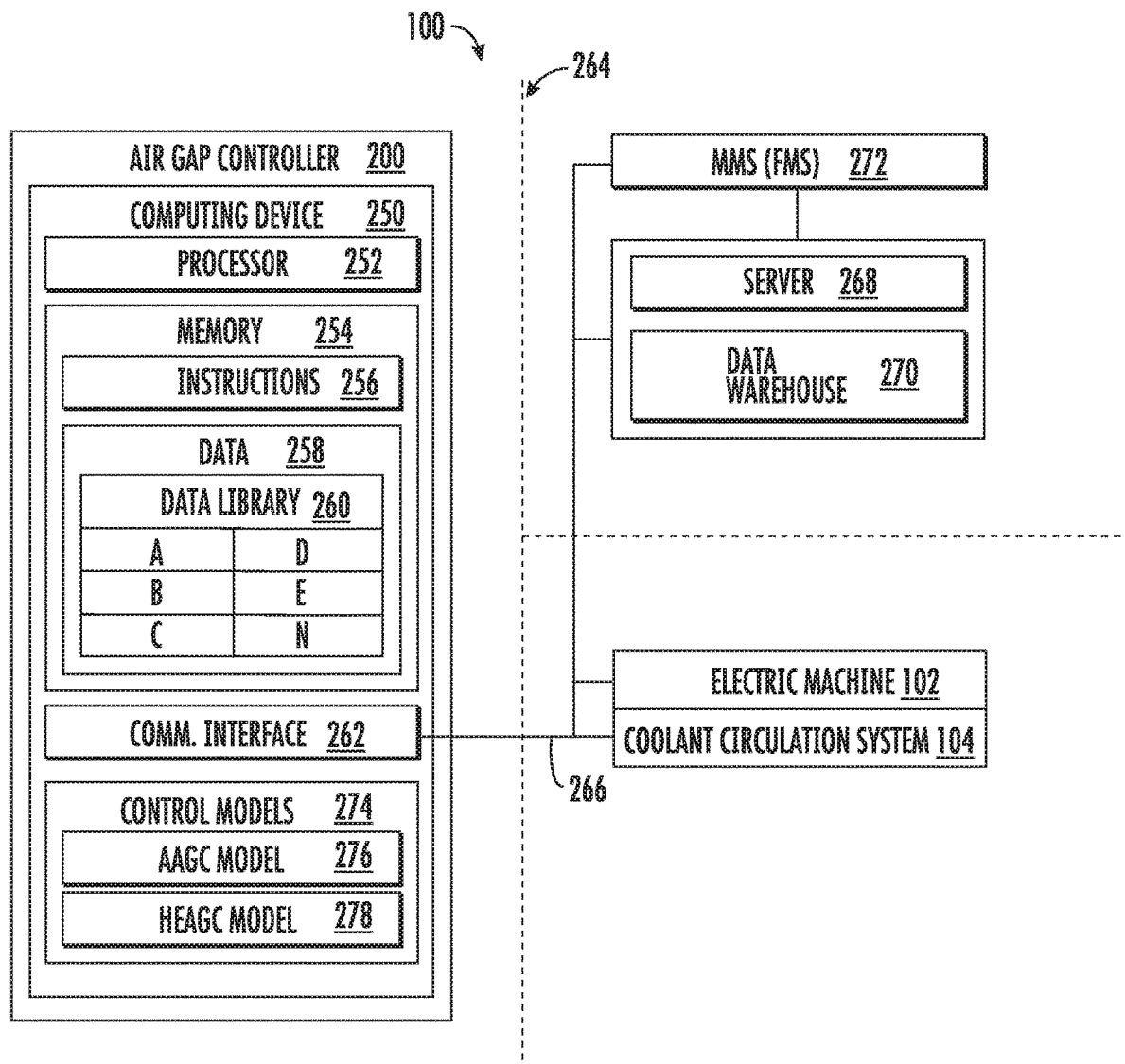
FIG. 2 schematically depicts an exemplary air gap controller which may be implemented in an air gap control system.

Still referring to FIG. 2, an exemplary air gap controller 200 includes one or more air gap control models 274 configured to control the length L of the air gap 118 based at least in part on one or more model inputs, including inputs pertaining to operating parameters and/or operating conditions pertaining to the electric machine 102. An exemplary air gap control model 274 may be configured provide a determined air gap length value and compare the determined air gap length value to an air gap target value. If the determined air gap length value differs from the air gap target value (e.g., by more than a predefined threshold amount), the air gap control model 274 may output a control command and the air gap controller 200 may transmit an output 204 that includes the control command to one or more controllable devices to adjust the length L of the air gap 118 so as to become closer to the target value. The air gap controller 200 may transmit a series of outputs 204 that include one or more control commands to the one or more controllable devices, for example, until the determined length L of the air gap 118 agrees with the air gap target value (e.g., until the determined length L of the air gap 118 differs from the air gap target value by less than a predefined threshold amount). The outputs 204 that include the control commands may be routed from the air gap controller 200 to the one or more controllable devices via the communication interface 262. Exemplary air gap control models 274 include an Active Air Gap Control (AAGC) model 276 and a High Efficiency Air Gap Control (HEAGC) model 278 as described herein.

Figure 3:
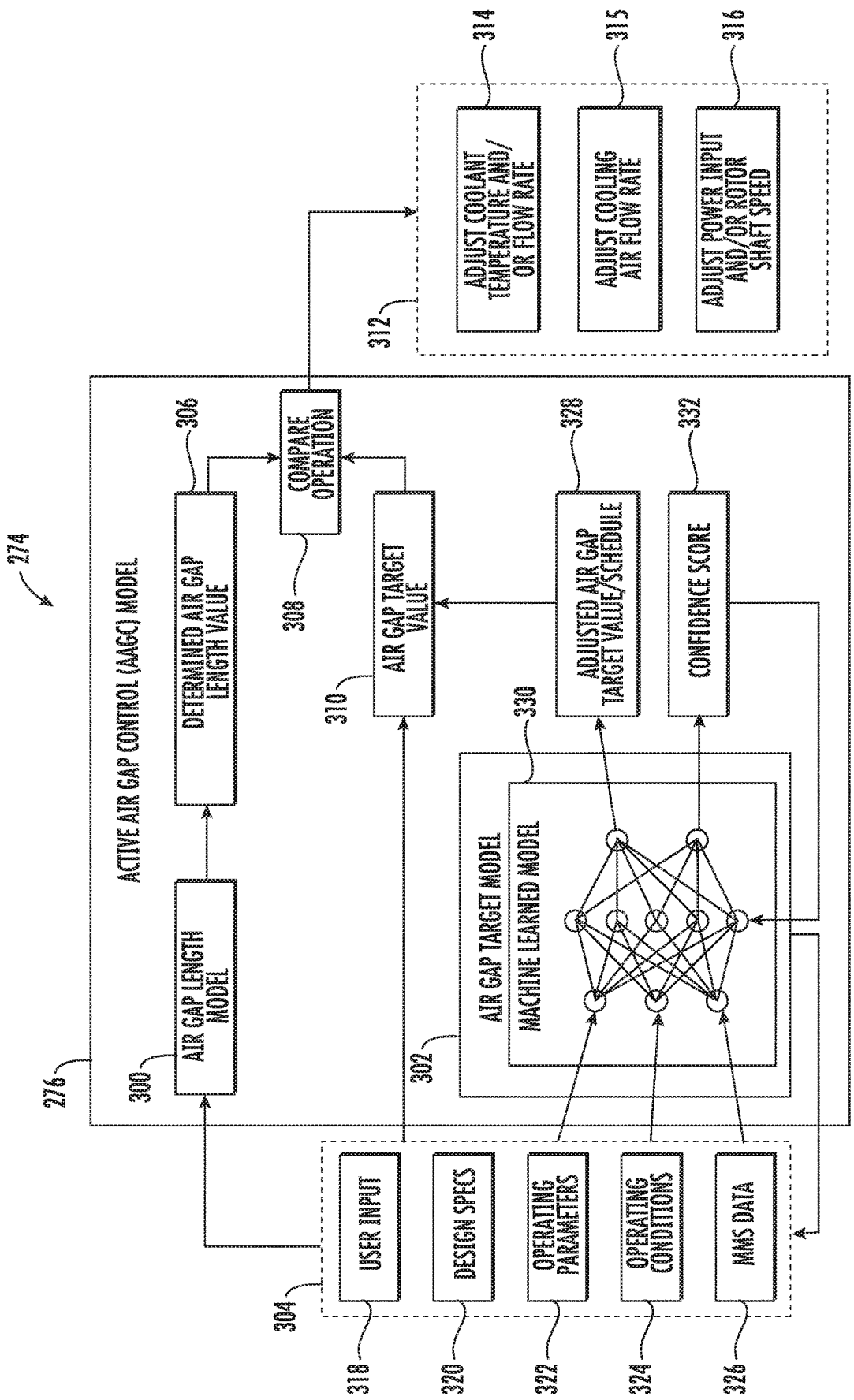
FIG. 3 schematically depicts and exemplary air gap control model which may be utilized by an air gap controller.

Now referring to FIG. 3, an exemplary air gap control model 274 is shown. By way of example, the exemplary air gap control model 274 shown in FIG. 3 is an AAGC model 276. As shown, the AAGC model 276 may include an air gap length model 300 and an air gap target model 302. The air gap length model 300 receives one or more model inputs 304. Using the model inputs 304, the air gap length model 300 determines and outputs a determined air gap length value 306. The air gap target model 302 receives one or more model inputs 304 and outputs an adjusted air gap target value 328. In one embodiment, the air gap length model 300 may be based at least in part on a coefficient of thermal expansion for one or more components of a rotor core assembly 106 and/or a stator core assembly 108. For example, the coefficient of thermal expansion may include a coefficient of radial thermal expansion for laminations of the rotor core 110 and/or for laminations of the stator core 114. In another embodiment, the air gap length model 300 additionally or alternatively may be based at least in part on an amount of centrifugal force exhibited by a rotor core assembly 106.

The determined air gap length value 306 and/or the adjusted air gap target value 328 may depend at least in part on the way the electric machine 102 is currently being operated and/or how the electric machine 102 has been uniquely operated in the past. The determined air gap length value 306 and/or the adjusted air gap target value 328 may include one or more values, including a current or real-time value, an average, a maximum, a minimum, and/or a range. The determined air gap length value 306 and/or the adjusted air gap target value 328 may additional include one or more statistical parameters, such as a distribution value (e.g., a variance, a standard deviation) and/or a regression coefficient value.

The AAGC model 276 performs a compare operation 308. The compare operation 308 includes one or more operations configured to compare the determined air gap length value 306 to an air gap target value 310. The compare operation 308 may include a PID controller or any other suitable controller. The compare operation 308 may utilize linear or non-linear control algorithms, and any analytical technique including frequency domain and/or time-domain state space representation techniques. The air gap target value 310 may be derived or determined from one or more model inputs 304 and/or from the air gap target model 302. Based on the compare operation 308, the AAGC model 276 provides one or more control commands 312 which may be included in an output 204 from an air gap controller 200. For example, if the determined air gap length value 306 differs from the air gap target value 310 by a predefined threshold amount, then the AAGC model 276 provides one or more control commands 312 to adjust the length L of the air gap 118 so as to become closer to the air gap target value 310. The one or more control commands 312 may include a command configured to change one or more operating parameters of the electric machine. For example, such a control command 312 may be configured to adjust a temperature of the coolant 126 and/or a flow rate of the coolant 126 (314), to adjust a flow rate of the cooling air 146 (315), and/or to adjust a power input and/or speed of the rotor shaft 112 (316). Such a control command 312 may be effective to adjust a length L of an air gap 118.

Any number of model inputs 304 may be used by an air gap control model 274, including current or real-time data 258, past data 258, or a combination thereof. The one or more model inputs 304 may include data 258 associated with or generated by an air gap control system 100, including data 258 associated with or generated by an electric machine 102 and/or a coolant circulation system 104 for the electric machine 102. Such data associated with an air gap control system 100 may additionally or alternatively including data 258 associated with or generated by an air gap controller 200, a computing device 250, and/or an air gap control model 274. The model inputs 304 may include data 258 associated with, comprising, or generated by an air gap controller 200, data 258 associated with, comprising, or generated by a computing device 250, and/or data associated with, comprising, or generated by an air gap control model 274. As examples, the model inputs 304 may include data 258 associated with or comprising one or more user inputs 318, data 258 associated with or comprising design specifications 320 for an electric machine 102, data 258 associated with or comprising operating parameters 322, data 258 associated with or comprising operating conditions 324, data 258 associated with or comprising mission management system (MMS) data 326, and combinations thereof. The model inputs 304 may themselves be regarded as data 258, which may be stored in the data library 260 and/or the data warehouse 270, and which may be included in subsequent model inputs 304. The model inputs 304 may additionally include other data sets, parameters, outputs, information, etc. shown and/or described herein.

Exemplary user inputs 318 may include data 258 associated with or comprising one or more set points for the operation of the electric machine 102, including a power input set point or a power output set point for the electric machine 102, a temperature set point for the coolant 126, a flow rate set point for the coolant 126, a flow rate set point for the cooling air 146, a temperature set point for the rotor core assembly 106 or various components thereof, and a temperature set point for the stator core assembly 108 or various components thereof.

Exemplary design specifications 320 may include data 258 associated with or comprising a nominal air gap length when the electric machine 102 is at idle or at steady state under certain operating conditions 324, a maximum air gap length, a minimum air gap length, coefficients of thermal expansion (Y) for various components of the electric machine 102, and/or other design information pertaining to the electric machine 102.

Exemplary operating parameters 322 may include data 258 associated with or comprising parameters associated with the operation of the electric machine 102 and/or the coolant circulation system 104. Such operating parameters 322 may include sensed, measured, determined, or predicted operating speeds, flow rates, power input levels, power output levels, and the like. For example, exemplary operating parameters 322 may include data from one or more sensors, including one or more temperature sensors, 206, 208, 210, 212, 214, 216, 217, 219 one or more power sensors 218, 220, one or more rotor speed sensors 222, one or more air gap sensors 224, 226. Additionally, or in the alternative, exemplary operating parameters 322 may include operating states or set points associated with one or more controllable devices, including one or more control valves 228, 230, 232, one or more controllable dampers 150, one or more pumps 134, 136, and/or one or more power control units 234. Any one or more of such operating parameters 322 may be included in a model input 304.

In one embodiment, a model input 304 may include data 258 associated with or comprising one or more coolant temperature inputs, which may be provided by one or more coolant temperature sensors 206, 208, 210, 212, and/or one or more cooling air temperature sensors 217, 219. The one or more coolant temperature inputs may include a first temperature input from a first temperature sensor 206 configured to ascertain a temperature of coolant 126 flowing into a rotor core assembly 106, and/or a second temperature input from a second temperature sensor 208 configured to ascertain a temperature of coolant 126 flowing out of the rotor core assembly 106. Additionally, or in the alternative, the one or more coolant temperature inputs may include a third temperature input from a third temperature sensor 210 configured to ascertain a temperature of coolant 126 flowing into a stator core assembly 108, and/or a fourth temperature input from a fourth temperature sensor 212 configured to ascertain a temperature of coolant 126 flowing out of the stator core assembly 108.

In another embodiment, a model input 304 may additionally or alternatively include data 258 associated with or comprising one or more rotor core assembly temperature inputs and/or one or more stator core assembly temperature inputs, which may be provided by one or more coolant temperature sensors 214, 216. A rotor core assembly temperature input may include a fifth temperature input from a fifth temperature sensor 214 configured to ascertain a temperature of a rotor core assembly 106. The temperature of the rotor core assembly 106 may include a temperature of a rotor core 110 and/or a temperature of a rotor shaft 112. A stator core assembly temperature input may include a sixth temperature input from a sixth temperature sensor 216 configured to ascertain a temperature of a stator core assembly 108. The temperature of the stator core assembly 108 may include a temperature of a stator core 114 and/or a temperature of a stator housing 116.

In yet another embodiment, a model input 304 may additionally or alternatively include data 258 associated with or comprising one or more cooling air temperature inputs, which may be provided by one or more cooling air temperature sensors 217, 219. The one or more cooling air temperature inputs may include a seventh temperature input from a seventh temperature sensor 217 configured to ascertain a temperature of cooling air 146 flowing through an inlet side of the air conduit 148. The one or more cooling air temperature inputs may additionally or alternatively include an eighth temperature input from an eighth temperature sensor 219 configured to ascertain a temperature of cooling air 146 flowing through an outlet side of the air conduit 148.

In yet another embodiment, a model input 304 may additionally or alternatively include data 258 associated with or comprising one or more power sensor inputs provided by one or more power sensors 218, 220, and/or one or more rotor speed inputs provided by one or more rotor speed sensors 222.

In yet another embodiment, a model input 304 may additionally or alternatively include data 258 associated with or comprising one or more air gap length inputs provided by one or more air gap sensors 224, 226.

Exemplary operating conditions 324 may include data 258 associated with or comprising operating modes, as well as sensed, measured, calculated, or predicted conditions internal or external to the electric machine 102 which may affect the operation thereof. Such internal conditions include temperatures, pressures, heat transfer rates, vibration levels, magnetic flux, etc. Such external conditions include ambient temperature, pressure, humidity, wind speed, etc.

Exemplary MMS data 326 may include data 258 associated with or comprising current, planned, or proposed mission plans. For example, when the electric machine 102 is implemented in an aircraft, marine vessel, or motor vehicle, or the like, the MMS data 326 can include data 258 associated with or comprising current or past missions (e.g., flight missions, marine missions, land missions) for the electric machine 102, including GPS coordinates or waypoints such as the origin and destination and various intermediate GPS coordinates or waypoints, projected path of travel, altitude information, weather information, estimated time in route, as well as various operator inputs.

In some embodiments, the air gap target model 302 may include a machine-learned model 330 that allows the AAGC model 276 to control the length L of the air gap 118 without being explicitly programmed to carry out any particular control protocol. The adjusted air gap target value 328 may be applicable for an entire operating period or for a portion of an operating interval, such as all or a portion of a mission, or all or a portion of a service interval. For example, when the electric machine 102 is implemented in an aircraft, the adjusted air gap target value 328 output by the air gap target model 302 (e.g., the machine-learned model 330) may apply to particular altitude or range of altitudes of a flight.

A machine-learned model 330 may use any suitable machine learning technique, operating regime, or algorithm. A machine-learned model 330 may be configured to use pattern recognition, computational learning, artificial intelligence, or the like to derive algorithms that allow the machine-learned model 330 to determine an air gap target value 310. A machine-learned model 330 may include an unsupervised or a supervised learning regime, including a semi-supervised learning regime, an active learning regime, a reinforcement learning regime, and/or a representation learning regime. A machine-learned model 330 may utilize neural networks, decision trees, association rules, inductive logic algorithms, cluster analysis algorithms, and the like. In some embodiments, the model inputs 304 may include data 258 associated with or generated by a machine-learned model 330.

By way of example, the machine-learned model 330 shown in FIG. 3 includes a neural network. However, an exemplary machine-learned model 330 may include any other suitable model, including a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, an artificial neural network model, a C4.5 model, a k-means model, and combinations thereof. Even further additional suitable types of machine or statistical learning models are also contemplated. It will also be appreciated that the machine-learned model 330 can use certain mathematical methods alone or in combination with one or more machine or statistical learning models.

In some embodiments, the compare operation 308 of an AAGC model 276 may be configured to compare determined air gap length values 306 to an air gap target schedule 310 which may include a series of air gap target values 310 corresponding to different points of an Operating Interval, such as a Mission or a Service Interval. The air gap target schedule may be provided by or derived from one or more model inputs 304, and/or an air gap target model 302. For example, the machine-learned model 330 may output an adjusted air gap target schedule 328. An air gap target schedule 310 or an adjusted air gap target schedule 328 may include air gap target values 310 and/or adjusted air gap target values 328 for all or a portion of an Operating Interval, such as all or a portion of a Mission, or all or a portion of a Service Interval. For example, when the electric machine 102 is implemented in an aircraft, an air gap target schedule or an adjusted air gap target schedule may be provided for all or a portion of a flight mission, including for various flight phases, such as takeoff, climb, cruise, descent, approach and land, missed approach, etc. As another example, an air gap target schedule or an adjusted air gap target schedule may be provided for all or a portion of a Service Interval, including for various periods between services or maintenance, such as a break-in period, a normal operating period, and a wear-out period.

In addition to outputting an adjusted air gap target value 328, in some embodiments an air gap target model 302 (e.g., a machine-learned model 330) may output a confidence score 332, which may provide an indication as to a level of confidence attributable to one or more outputs. The confidence score 332 can be used, for example, to set a margin of error to be used by the air gap target model 302 in determining an adjusted air gap target value 328. For example, in the event of a low confidence score 332 the air gap target model 302 may account for a more conservative or wide margin for error when determining an adjusted air gap target value 328, whereas in the event of a high confidence score 332 the air gap target model 302 may allow for a more aggressive or narrow margin for error when determining an adjusted air gap target value 328. In some embodiments, the model inputs 304 may include data 258 associated with or comprising a confidence score 332.

Figure 4:
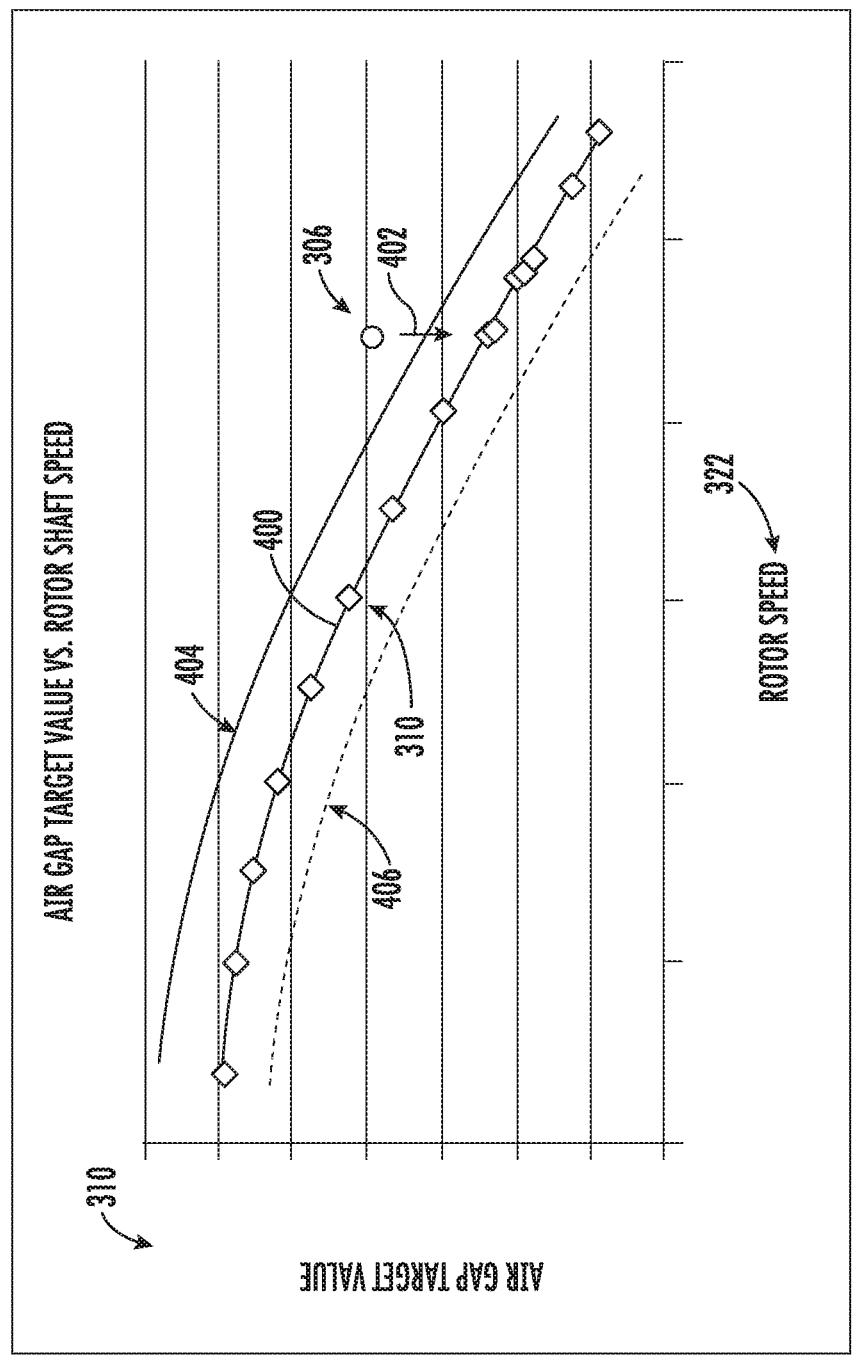
FIG. 4 is a chart depicting an exemplary correlation between an air gap target value and an operating parameter.

Now referring to FIG. 4, an exemplary correlation 400 between an air gap target value 310 and an operating parameter 322 is shown. An air gap control model 274 may utilize an operating parameter 322 as a model input 304 to determine an air gap target value 310 based at least in part on such a correlation 400. The correlation 400 may be predetermined, for example, based on user input 318 and/or design specifications 320. Alternatively, or in addition, a correlation 400 between an operating parameter 322 and an air gap target value 310 may be provided by an air gap target model 302. For example, such a correlation 400 may be provided as a machine-learned output from a machine-learned model 330. As shown in FIG. 4, the operating parameter 322 shown in the exemplary correlation 400 is a rotor shaft speed. It will be appreciated, however, that an air gap target value 310 may be correlated with numerous other operating parameters 322, among other model inputs 304, and the example shown in FIG. 4 is not intended to be limiting.

An air gap control model 274 may utilize a correlation 400 to determine an air gap target value 310. In some embodiments, the air gap target values 310 provided in the correlation 400 may be selected so that the electric machine 102 can accelerate from any given rotor shaft speed to a maximum continuous speed (e.g., so that a snap acceleration can be performed) without causing the rotor core 110 to contact the stator core 114 and/or without introducing an unacceptable risk that the rotor core 110 might contact the stator core 114. As shown in FIG. 4, when a determined air gap length value 306 differs from an air gap target value 310, for example, as determined by a compare operation 308 (FIG. 3), the air gap control model 274 may provide one or more control commands 312 (FIG. 3) so as to adjust the length L of the air gap 118 so as to become closer to the air gap target value 310, as shown by the downwards arrow 402. The correlation 400 may include an upper threshold 404 and a lower threshold 406. The compare operation 308 may be configured to output a control command 312 only if the determined air gap length value 306 falls outside of the range defined by the upper threshold 404 and the lower threshold 406.

Referring again to FIG. 2, another exemplary air gap control model 274 may include an HEAGC model 278. An HEAGC model 278 may be configured to restrict the acceleration rate of the electric machine 102 and or to increase the length L of the air gap 118 to reduce the risk of the rotor core 110 contacting the stator core 114 during an unexpected or a planned high acceleration event. The HEAGC model 278 may be utilized generally, or under various specific operating conditions 324 and/or during various specific stages of a mission such as a flight mission. When an electric machine 102 is expected to maintain relatively stable operation, the HEAGC model 278 may be utilized to restrict the acceleration rate of the electric machine 102 so as to reduce the risk of the rotor core 110 contacting the stator core 114 during an unexpected high acceleration event. When a high acceleration event is expected, the HEAGC model 278 may disable the restriction on the acceleration rate of the electric machine 102 and correspondingly adjust the air gap target value 310 so as to increase the length L of the air gap 118, thereby reducing the risk of the rotor core 110 contacting the stator core 114 during the expected high acceleration event. After the expected high acceleration has passed, the HEAGC model 278 can reduce the length L of the air gap 118, and/or once again restrict the rate of acceleration.

The HEAGC model 278 and its control logic may be used separately or in conjunction with the AAGC model 276. For example, the AAGC model 276 can operate to adjust the air gap target value 310 and reduce the length L of the air gap 118 so as to become closer to the air gap target value 310. The HEAGC model 278 can be complimentary to the AAGC model 276, but the HEAGC model 278 is not required.

Figure 5:
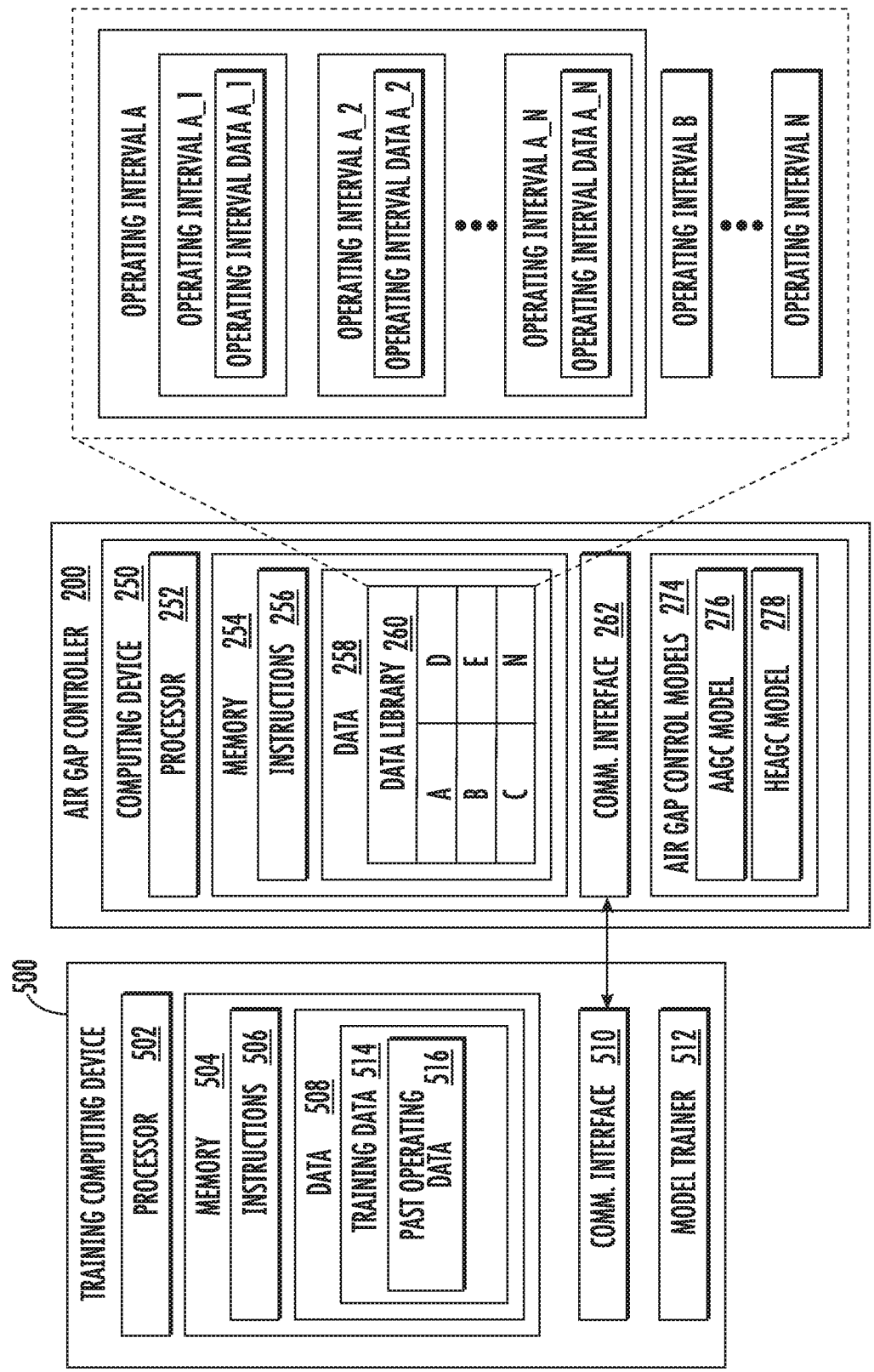
FIG. 5 schematically depicts an exemplary training computing device which may be used to train an air gap target model.

Now referring to FIG. 5, an exemplary training computing device 500 is shown. In some embodiments an air gap target model 302 (e.g., a machine-learned model 330) may be trained using a training computing device 500. The training computing device 500 may be communicatively coupled with the air gap controller 200 via the communications network 264 (FIG. 2). Alternatively, the training computing device 500 may be included as a part of the air gap controller 200. For example, the training computing device 500 may be part of the computing device 250 included as part of the air gap controller 200. The training computing device 500 may include one or more processors 502 (e.g., a processor 252) and one or more memory devices 504 (e.g., memory device 254). The one or more memory devices 504 can store information accessible by the one or more processors 502, including computer-readable instructions 506 that may be executed by the one or more processors 502. The memory devices 504 can further store data 508 that may be accessed by the one or more processors 502. The training computing device 500 can also include a communication interface 510 used to communicate with resources on the communication network 264 (FIG. 2). The hardware, implementation, and functionality of the components of the training computing device 500 may operate, function, and include the same or similar components as those described with respect to the one or more computing devices 250 of the one or more air gap controllers 200.

The training computing device 500 includes a model trainer 512 configured to train one or more air gap control models 274, including an air gap length model 300 and/or an air gap target model 302 (e.g., a machine-learned model 330). The model trainer 512 may use any one or more various training or learning techniques such as backwards propagation of errors, which may include performing truncated backpropagation through time. In some embodiments, supervised training techniques may be used on a set of labeled training data. The model trainer 512 may perform a number of generalization techniques (e.g., weight decays, dropouts, etc.) to improve the generalization capability of the control model 274 being trained.

In some embodiments, the model trainer 512 can train one or more air gap control models 274 based on a set of training data 514. The training data 514 may include past operating data 516, which may include, for example, previous operating parameters 322, previous operating conditions 324, and previous MMS data 326. In some embodiments, the training data 514 may include at least a portion of the data library 260. Alternatively, the data library 260 may include the training data 514 or at least a portion thereof.

The model trainer 512 may utilize past operating data 516 to train one or more air gap control models 274 how the electric machine 102 has been actually and/or uniquely operated in the past under particular operating conditions 324, such as during a particular Operating Interval, such as a particular Mission or Service Interval. Additionally, or in the alternative, the model trainer 512 may utilize past operating data 516 to validate or test an air gap control model 274, including the determined air gap length model 300 and/or the air gap target model 302 (e.g., the machine-learned model 330).

A specific subset of training data 514, such as a specific subset of past operating data 516, may be selected when training an air gap control model 274. For example, as shown in FIG. 5 past operating data 516 for one or more particular Missions may be selected from the data library 260 or other memory device. The past operating data 516 may be representative of several occurrences of one or more particular Missions. The past operating data 516 for Mission A may include mission data for Mission A_1, Mission A_2, and so on to the Nth occurrence of Mission A. Such past operating data 516 for Mission A may be utilized by the model trainer 512 to train the air gap target model 302 (e.g., the machine-learned model 330) how the electric machine 102 has been actually and/or uniquely operated over the course of several occurrences of the particular Mission. Likewise, the model trainer 512 can train the machine-learned model 330 so that the machine-learned model 330 is able to machine-learn how the electric machine 102 has been actually and uniquely operated with respect to Mission B, and so on up to Mission N.

While the example of a Mission is provided, it will be appreciated that the model trainer 512 may train an air gap control model 274 with respect to any other Operating Interval (e.g., with respect to a Service Interval). Additionally, it will be appreciated that the model trainer 512 can process or pre-process the past operating data 516, for example, to disregard outlier data so that it will not be used to train, test, and/or validate the air gap control model 274. Such outlier data may include outlier occurrences of a particular Mission or other Operating Interval, and/or particular Missions or other Operating Intervals that differ significantly from a group or category of Missions or other Operating Intervals.

Figure 6:
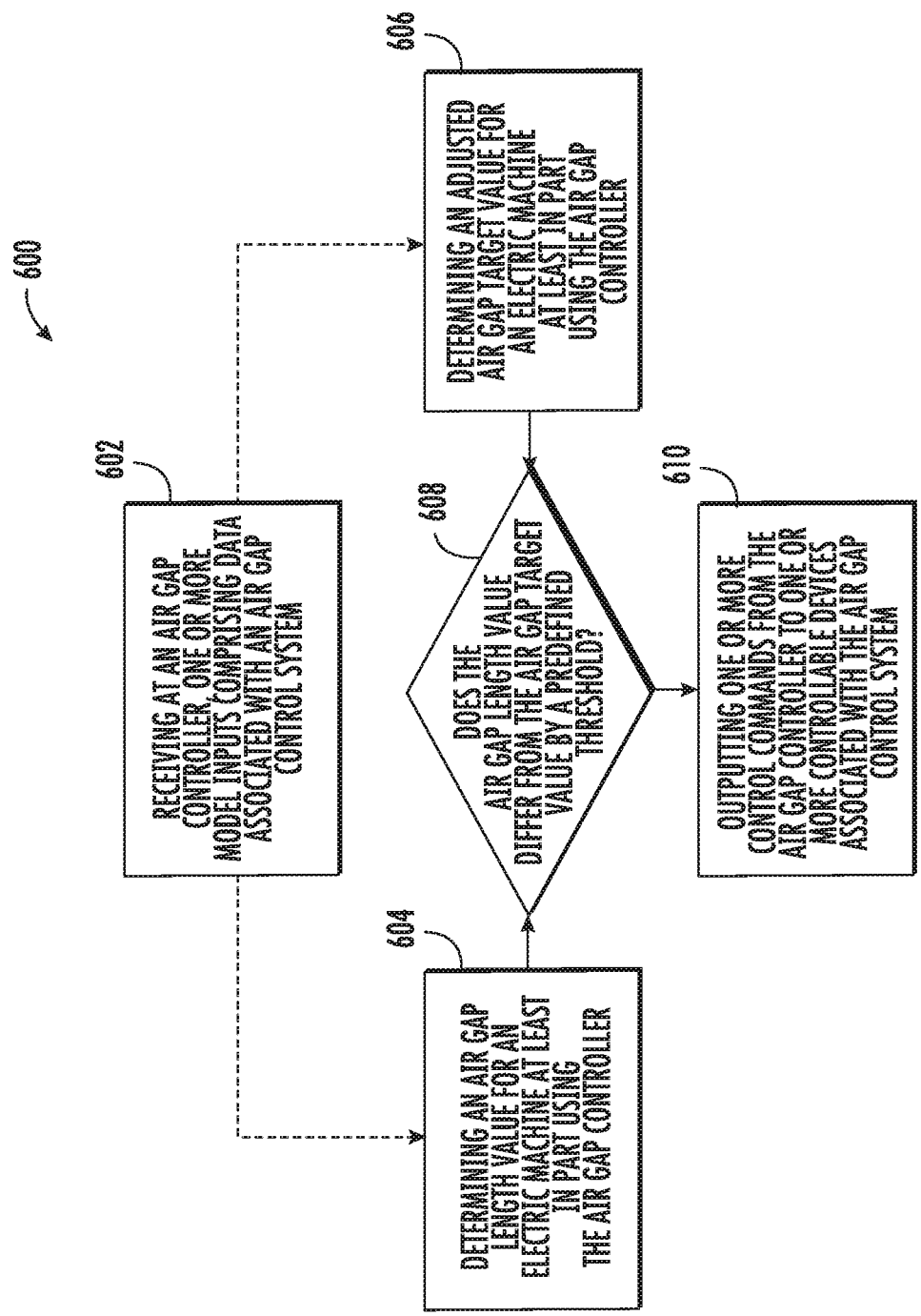
FIG. 6 is a flow chart depicting an exemplary method of controlling a length of an air gap in an electric machine.

Now referring to FIG. 6, an exemplary method 600 of controlling a length L of an air gap 118 in an electric machine 102 using an air gap controller 200 will be discussed. The exemplary method 600 commences with receiving at an air gap controller, one or more model inputs comprising data associated with an air gap control system 100, including data associated with an electric machine and/or data associated with a coolant circulation system 104 for the electric machine 602. The data associated with the coolant circulation system 104 may include data associated with a coolant circulation system 104 that provides cooling utilizing a stream of coolant 126 from a cooling conduit 124 and/or a stream of cooling air from an air conduit. The exemplary method continues with determining with the air gap controller an air gap length value for the electric machine using an air gap length model 604, and/or determining with the air gap controller an adjusted air gap target value for the electric machine using an air gap target model 606. The air gap length model and/or the air gap target model may be configured to utilize the one or more model inputs. The air gap length value and/or the adjusted air gap target value may be based at least in part on the one or more model inputs. An exemplary method continues by comparing with the air gap controller, an air gap length value to an air gap target value 608. The air gap length value may be a pre-existing air gap length value or a determined air gap length value from step 604. The air gap target value may be a pre-existing air gap target value, or an adjusted air gap target value determined in step 606. The comparison ascertains whether the air gap length value differs from the air gap target value by a predefined threshold. The exemplary method continues by outputting with the air gap controller, one or more control commands to one or more controllable devices associated with the air gap control system 100, including one or more controllable devices associated with the electric machine 102 and/or the coolant circulation system 104, when the air gap length value differs from the air gap target value by a predefined threshold 610. The one or more control commands are intended to adjust a length L of an air gap 118 between an outer surface of a rotor core 110 and an inner surface of a stator core 114 of an electric machine 102 so as to become closer to the air gap target value. As such, the one or more control commands 312 may be configured to impart a change to one or more operating parameters 322 of the electric machine 102 and/or of the coolant circulation system 104 to adjust the length L of an air gap 118.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of controlling a length of an air gap in an electric machine using an air gap controller, the method comprising:
   determining an air gap length value for an electric machine at least in part using an air gap controller;
   comparing the determined air gap length value to an air gap target value using the air gap controller; and
   outputting one or more control commands from the air gap controller to one or more controllable devices associated with an air gap control system when the determined air gap length value differs from the air gap target value by a predefined threshold;
   wherein the one or more control commands are configured to impart a change to one or more operating parameters associated with the air gap control system to adjust a length of an air gap between an outer surface of a rotor core and an inner surface of a stator core of the electric machine, and
   wherein the air gap target value comprises an adjusted air gap target value, the adjusted air gap target value having been provided by an air gap target model.

2. The method of claim 1, comprising the air gap length value determined based at least in part on an air gap length model, the air gap length model configured to utilize one or more model inputs to calculate the air gap length value.

3. The method of claim 1, wherein the one or more controllable devices and/or the one or more operating parameters are associated with an electric machine and/or an air gap control system.

4. The method of claim 1, comprising:
   receiving at the air gap controller, one or more model inputs comprising data associated with the air gap control system;
   wherein the one or more model inputs comprises one or more of: a user input, a design specification, an operating parameter, an operating condition, and/or MMS data.

5. The method of claim 4, wherein the one or more model inputs comprises one or more coolant temperature inputs, the one or more coolant temperature inputs provided by one or more coolant temperature sensors; and/or wherein the one or more model inputs comprises one or more cooling air temperature inputs, the one or more cooling air temperature inputs provided by one or more cooling air temperature sensors.

6. The method of claim 5,
wherein the one or more coolant temperature inputs comprises a first temperature input from a first temperature sensor, the first temperature sensor configured to ascertain a temperature of coolant flowing into a rotor core assembly, and/or a second temperature input from a second temperature sensor, the second temperature sensor configured to ascertain a temperature of coolant flowing out of the rotor core assembly; and/or
wherein the one or more coolant temperature inputs comprises a third temperature input from a third temperature sensor, the third temperature sensor configured to ascertain a temperature of coolant flowing into a stator core assembly, and/or a fourth temperature input from a fourth temperature sensor, the fourth temperature sensor configured to ascertain a temperature of coolant flowing out of the stator core assembly.

7. The method of claim 5, wherein the one or more coolant temperature inputs comprises:
a fifth temperature input from a fifth temperature sensor, the fifth temperature sensor configured to ascertain a temperature of a rotor core assembly, and/or a sixth temperature input from a sixth temperature sensor, the sixth temperature sensor configured to ascertain a temperature of a stator core assembly; and/or
a seventh temperature input from a seventh temperature sensor, the seventh temperature sensor configured to ascertain a temperature of cooling air flowing through an inlet side of an air conduit, and/or
an eighth temperature input from an eighth temperature sensor, the eighth temperature sensor configured to ascertain a temperature of cooling air flowing through an outlet side of the air conduit.

8. The method of claim 5, wherein the air gap length model is based at least in part on a coefficient of thermal expansion for one or more components of a rotor core assembly and/or a stator core assembly.

9. The method of claim 1, wherein the one or more model inputs comprises one or more power sensor inputs provided by one or more power sensors, and/or one or more rotor speed inputs provided by one or more rotor speed sensors.

10. The method of claim 9, wherein the air gap length model is based at least in part on an amount of centrifugal force exhibited by a rotor core assembly.

11. The method of claim 1, wherein the one or more model inputs comprises one or more air gap length inputs provided by one or more air gap sensors.

12. The method of claim 1, wherein the one or more control commands comprises a command configured to adjust a temperature and/or a flow rate of coolant flowing through a cooling conduit; and/or wherein the one or more control commands comprises a command configured to adjust a flow rate of cooling air flowing through an air conduit.

13. The method of claim 1, wherein the one or more controllable devices comprises a control valve configured to allow a volume of coolant flowing through the cooling conduit to bypass a heat exchanger.

14. A method of controlling a length of an air gap in an electric machine using an air gap controller, the method comprising:
receiving at an air gap controller, one or more model inputs comprising data associated with an air gap control system;
determining an adjusted air gap target value for an electric machine at least in part using the air gap controller;
comparing an air gap length value for the electric machine to the adjusted air gap target value using the air gap controller; and
outputting one or more control commands from the air gap controller to one or more controllable devices associated with the air gap control system when the air gap length value differs from the adjusted air gap target value by a predefined threshold;
wherein the one or more control commands are configured to impart a change to one or more operating parameters associated with the air gap control system to adjust a length of an air gap between an outer surface of a rotor core and an inner surface of a stator core of the electric machine, and
wherein the air gap target value comprises an adjusted air gap target value, the adjusted air gap target value having been provided by an air gap target model.

15. The method of claim 14, wherein the one or more model inputs comprises one or more of: a user input, a design specification, an operating parameter, an operating condition, and/or MMS data.

16. The method of claim 14, wherein the air gap target model comprises a machine-learned model.

17. The method of claim 14, wherein the machine-learned model utilizes a confidence score to set a margin of error for determining the adjusted air gap target value.

18. An air gap control system, the system comprising:
an electric machine comprising:
a rotor core assembly comprising a rotor core and a rotor shaft operably coupled to the rotor core;
a stator core assembly comprising a stator core and a stator housing operably coupled to the stator core, the stator core circumferentially surrounding the rotor core; and
an air gap having a length, L, the air gap located between and defined by an inner surface of the stator core and an outer surface of the rotor core;
a coolant circulation system, the coolant circulation system comprising a cooling conduit defining a pathway for circulating coolant through the electric machine and/or an air conduit defining a pathway for supplying cooling air to the electric machine; and
an air gap controller configured to control the length, L of the air gap at least in part by controlling or more of: a temperature of coolant flowing through the cooling conduit, a flow rate of coolant flowing through the cooling conduit, a temperature of cooling air flowing through the air conduit, a power input to the electric machine, and/or a rotor shaft speed of the electric machine,
wherein the air gap controller is configured to
determine an air gap length value for an electric machine at least in part using an air gap controller,
compare the determined air gap length value to an air gap target value using the air gap controller,
output one or more control commands from the air gap controller to one or more controllable devices associated with an air gap control system when the determined air gap length value differs from the air gap target value by a predefined threshold, and
control the length, L of the air gap based on the one or more control commands, and
wherein the air gap target value comprises an adjusted air gap target value, the adjusted air gap target value having been provided by an air gap target model.

19. The system of claim 18, wherein the system is implemented in an aircraft, a marine vessel, or a motor vehicle.

\* \* \* \* \*